US008958151B2

(12) United States Patent
Miyazaki

(10) Patent No.: US 8,958,151 B2
(45) Date of Patent: Feb. 17, 2015

(54) OCULAR ZOOM OPTICAL SYSTEM AND OPTICAL INSTRUMENT

(75) Inventor: Yosuke Miyazaki, Ichihara (JP)

(73) Assignee: Nikon Vision Co., Ltd., Tokyo (JP)

( * ) Notice: Subject to any disclaimer, the term of this patent is extended or adjusted under 35 U.S.C. 154(b) by 92 days.

(21) Appl. No.: 13/883,826

(22) PCT Filed: Oct. 14, 2011

(86) PCT No.: PCT/JP2011/073608
§ 371 (c)(1),
(2), (4) Date: Jul. 29, 2013

(87) PCT Pub. No.: WO2012/063596
PCT Pub. Date: May 18, 2012

(65) Prior Publication Data
US 2013/0293968 A1 Nov. 7, 2013

(30) Foreign Application Priority Data
Nov. 8, 2010 (JP) ................................. 2010-249416

(51) Int. Cl.
G02B 23/00 (2006.01)
G02B 25/00 (2006.01)
G02B 9/12 (2006.01)

(52) U.S. Cl.
USPC ........... 359/422; 359/432; 359/433; 359/643; 359/645; 359/661; 359/680; 359/682; 359/683; 359/684; 359/689; 359/753; 359/784; 359/809; 359/810

(58) Field of Classification Search
USPC ......... 359/422, 432, 433, 643, 645, 661, 680, 359/682–684, 689, 753, 784, 809, 810
See application file for complete search history.

(56) References Cited

U.S. PATENT DOCUMENTS 5,311,355 A * 5/1994 Kato ............................. 359/432
5,663,834 A * 9/1997 Koizumi ....................... 359/643
(Continued)

FOREIGN PATENT DOCUMENTS

JP 64-057223 A 3/1989
JP 06-175048 A 6/1994
(Continued)

OTHER PUBLICATIONS
International Search Report from International Patent Application No. PCT/JP2011/073608, Dec. 6, 2011.
(Continued)

Primary Examiner — Evelyn A. Lester
(74) Attorney, Agent, or Firm — Miles & Stockbridge P.C.

(57) ABSTRACT

Provided are an ocular zoom optical system which has a wide apparent field of view even on a low power side and in which aberrations are favorably corrected while a sufficient eye relief is secured over the entire zoom range, and an optical instrument including the ocular zoom optical system. The ocular zoom optical system 3 includes, in order from the object side: a first lens group G1 having a negative refractive power; a second lens group G2 having a positive refractive power; and a third lens group G3 having a positive refractive power and at least one aspheric surface. An intermediate image I' is formed between the first lens group G1 and the second lens group G2. During zooming, the third lens group G3 is fixed on the optical axis, and the first lens group G1 and the second lens group G2 are moved in directions opposite to each other with the intermediate image I' interposed therebetween. The second lens group G2 includes, in order from the object side: a positive single lens L21 having a higher positive refractive power on the lens surface on the eye-point side than that on the lens surface on the object side; and a positive cemented lens CL2 including a positive lens L22 and a negative lens L23.

6 Claims, 18 Drawing Sheets

(56) References Cited

U.S. PATENT DOCUMENTS

| | | | |
|---|---|---|---|
| 5,734,509 A * | 3/1998 | Ueno | 359/689 |
| 6,384,984 B1 | 5/2002 | Ishii et al. | |
| 6,606,203 B2 | 8/2003 | Nagatoshi | |
| 7,903,343 B2 | 3/2011 | Yamada | |
| 2002/0054437 A1* | 5/2002 | Ishii et al. | 359/645 |
| 2010/0149649 A1* | 6/2010 | Yamada | 359/645 |

FOREIGN PATENT DOCUMENTS

| | | |
|---|---|---|
| JP | 09-080326 A | 3/1997 |
| JP | 09-251131 A | 9/1997 |
| JP | 2001-242390 A | 9/2001 |
| JP | 2002-258167 A | 9/2002 |
| JP | 2011-002545 A | 1/2011 |
| WO | WO 2009/044836 A1 | 4/2009 |

OTHER PUBLICATIONS

Office Action issued Jul. 9, 2014, in Japanese Patent Application No. 2011-020133.

International Preliminary Report on Patentability from International Application No. PCT/JP2011/073608, May 14, 2013.

* cited by examiner

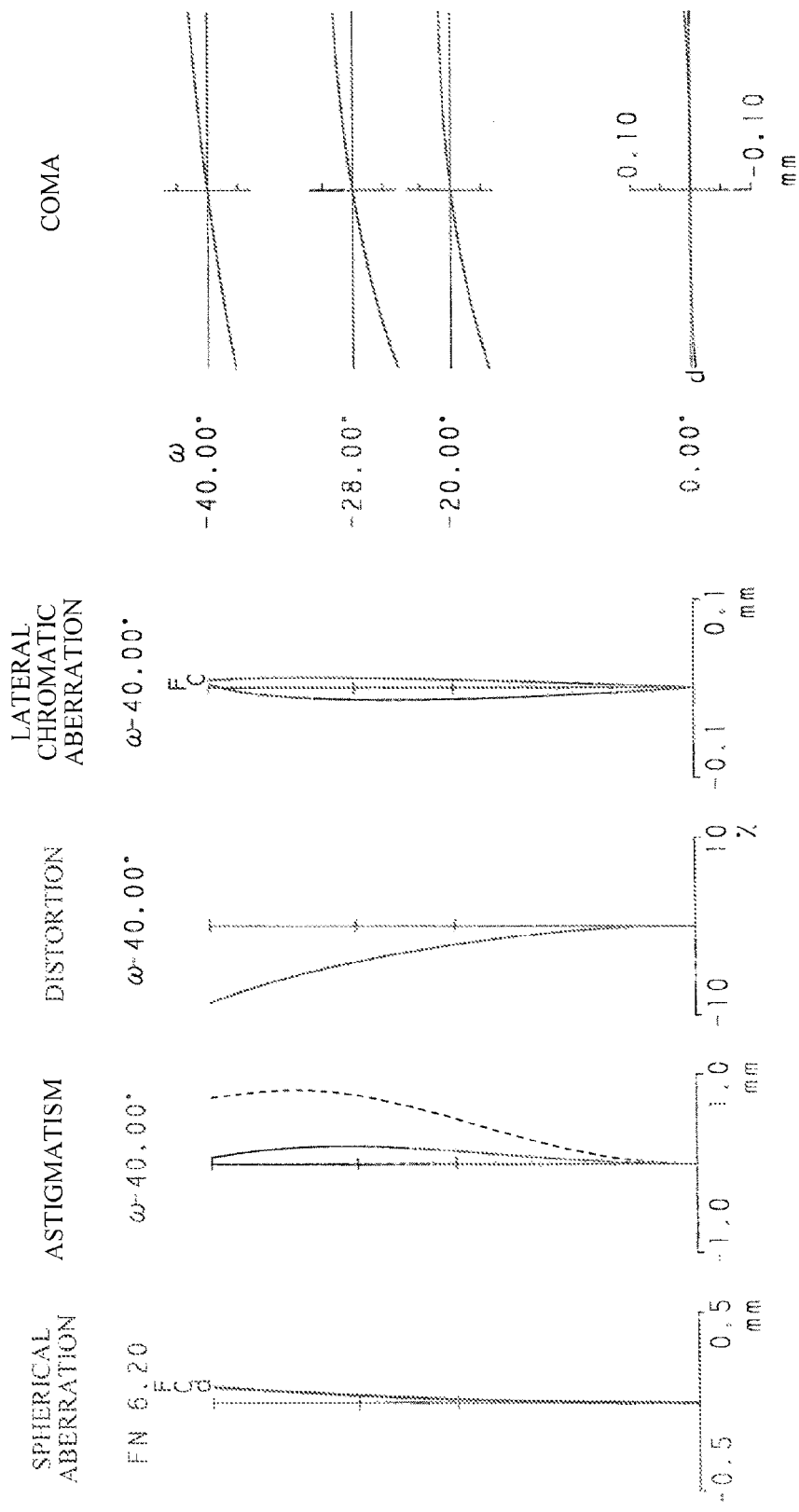

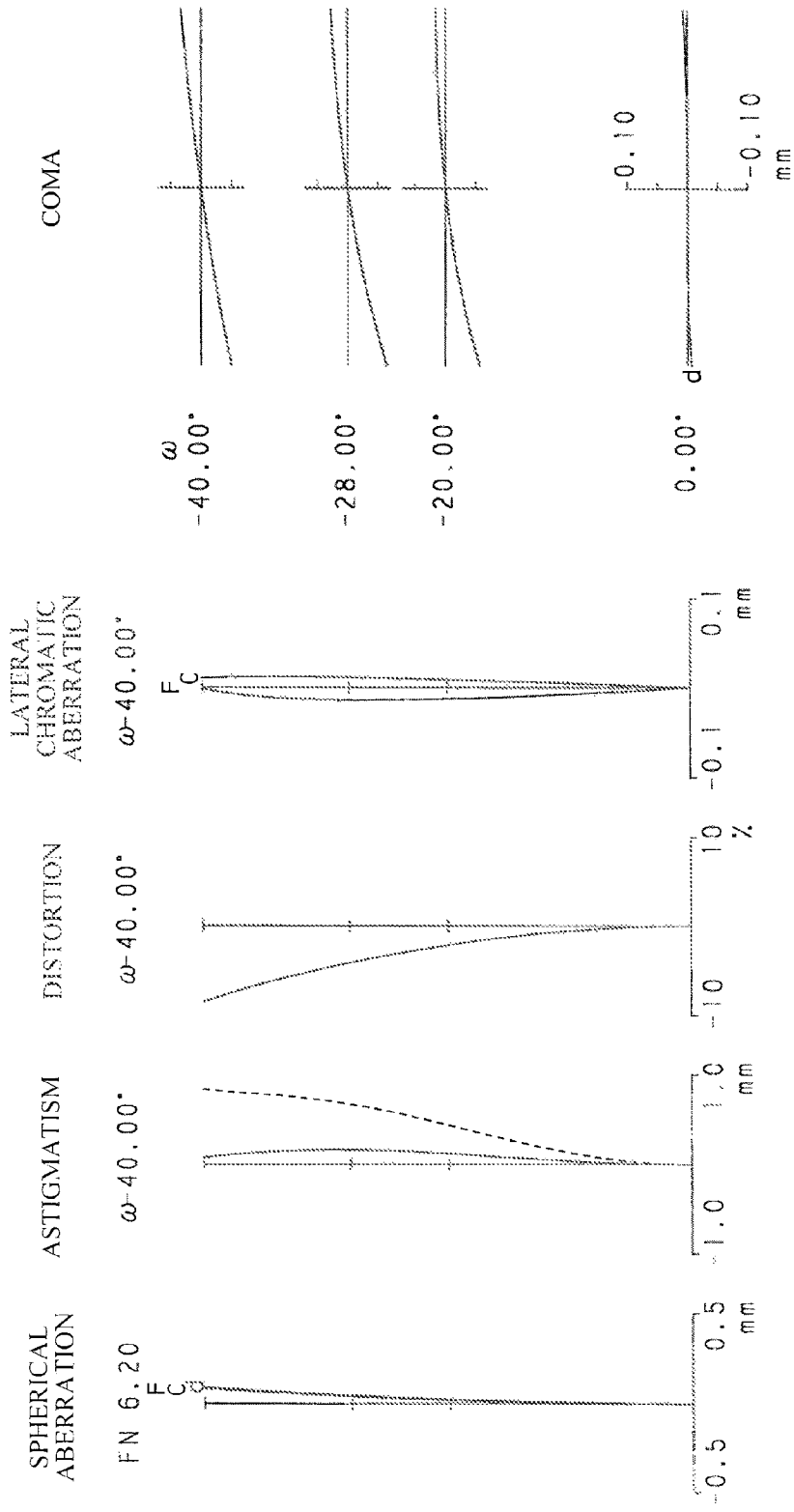

OCULAR ZOOM OPTICAL SYSTEM AND OPTICAL INSTRUMENT

TECHNICAL FIELD

The present invention relates to an ocular zoom optical system and an optical instrument including the ocular zoom optical system.

BACKGROUND ART

An ocular zoom optical system has been known that is employed for optical instruments, such as a telescope and binoculars, and has a configuration including a movable lens group having a negative refractive power, an intervening field stop, a movable lens group having a positive refractive power, and a fixed lens group having a positive refractive power, in order from the object side, thereby achieving zooming. For example, ocular zoom optical systems of such a type have been known that are a system with a zoom ratio of three and an apparent field of view of at least 40°, and a system with a zoom ratio of two and an apparent field of view of at least 500 (for example, see Patent Literature 1).

CITATION LIST

Patent Literature

[Patent Literature 1] Japanese Patent Laid-Open No. 2002-258167

SUMMARY OF INVENTION

Technical Problem

In such a conventional ocular zoom optical system, aberrations from low to high powers are favorably corrected. In this system, however, the apparent field of view at low power ranges from 40° to 50°, which is insufficient in comparison with a wide-field ocular optical system with a fixed magnification. As the apparent field of view is increased, aberrations, particularly, lateral chromatic aberration, distortion and chromatic aberration, significantly occur around the field of view. Furthermore, on a high power side, the spherical aberration of a pupil unfortunately occurs; this is a cause of vignetting at an intermediate angle of view and called the kidney bean effect.

The present invention is made in view of such problems, and has an object to provide an ocular zoom optical system which has a wide apparent field of view even on a low power side and in which aberrations are favorably corrected while a sufficient eye relief is secured over the entire zoom range, and an optical instrument including the ocular zoom optical system.

Solution to Problem

To solve the problems, an ocular zoom optical system according to the present invention includes, in order from the object side: a first lens group having a negative refractive power; a second lens group having a positive refractive power; and a third lens group having a positive refractive power and at least one aspheric surface. An intermediate image is formed between the first lens group and the second lens group. During zooming, the third lens group is fixed on the optical axis, and the first lens group and the second lens group are moved in directions opposite to each other with the intermediate image interposed therebetween. The second lens group includes, in order from the object side: a positive single lens whose lens surface on the eye-point side has a higher positive refractive power than the surface on the object side has; and a positive cemented lens including a positive lens and a negative lens. The zoom optical system satisfies the conditions of the following expressions, $$2.1 < f21/f2 < 2.8,$$

$$vd21 > 55,$$

$$f2/(fC2-fF2) > 90,$$

where the focal length of the second lens group is f2, the focal length of the single lens is f21, the Abbe number of the medium of the single lens is vd21, the focal length of the second lens group for C-line is fC2, and the focal length for F-line is fF2.

In such an ocular zoom optical system, it is preferable that the single lens included in the second lens group is a lens whose convex surface is on the eye-point side, and the condition of the following expression is satisfied, $$-2.2 \leq (rb+ra)/(rb-ra) \leq -1.0,$$

where the radius of curvature of the lens surface on the object side of the single lens is ra, and the radius of curvature of the lens surface on the eye-point side is rb.

In such an ocular zoom optical system, it is preferable that the third lens group is a cemented lens including a positive lens whose lens surface on the object side has a higher refractive power than the lens surface on the eye-point side has, and a biconcave lens, in order from the object side, and the conditions of the following expressions are satisfied, $$1.65 < nd31 < 1.74,$$

$$vd31 > 50,$$

where the refractive index of the medium of the positive lens included in the third lens group for d-line is nd31, and the Abbe number is vd31.

In such an ocular zoom optical system, it is preferable that the lens surface on the object side of the positive lens included in the third lens group is an aspheric surface satisfying the condition of the following expression in a range of $0 \leq h \leq 15$, $$\frac{c}{(1+0.2c^2h^2)^{1.5}} \leq \frac{d^2x}{dh^2} \leq \frac{c}{(1-0.6c^2h^2)^{1.5}} \quad \text{[Expression 1]}$$

where the height from the optical axis is h, the sag amount at the height h is x, and the reciprocal of the paraxial radius of curvature is c.

In such an ocular zoom optical system, it is preferable that the conditions of the following expressions are satisfied, $$2.5 < (-f1)/fm < 3.0,$$

$$3.2 < f2/fm < 4.0,$$

$$5.0 < f3/fm < 6.2,$$

where the focal length of the entire system in a high power end state is fm, the focal length of the first lens group is f1, and the focal length of the third lens group is f3.

An optical instrument according to the present invention includes any one of the above ocular zoom optical systems.

Advantageous Effects of Invention

The above configuration of the present invention can provide an ocular zoom optical system which has a wide apparent field of view even on a low power side and in which aberrations are favorably corrected while a sufficient eye relief is secured over the entire zoom range, and an optical instrument including the ocular zoom optical system.

BRIEF DESCRIPTION OF DRAWINGS

FIG. 2 is a lens configuration diagram for illustrating the configuration of the ocular zoom optical system and operation of lens groups during zooming.

FIG. 4 is diagrams of aberrations in the first example. FIG. 4(c) shows a high power end state.

FIG. 6 is diagrams of aberrations in the second example.

FIG. 8 is diagrams of aberrations in the third example.

FIG. 10 is diagrams of aberrations in the fourth example. FIG. 10(c) shows a high power end state.

DESCRIPTION OF EMBODIMENTS

Figure 1:
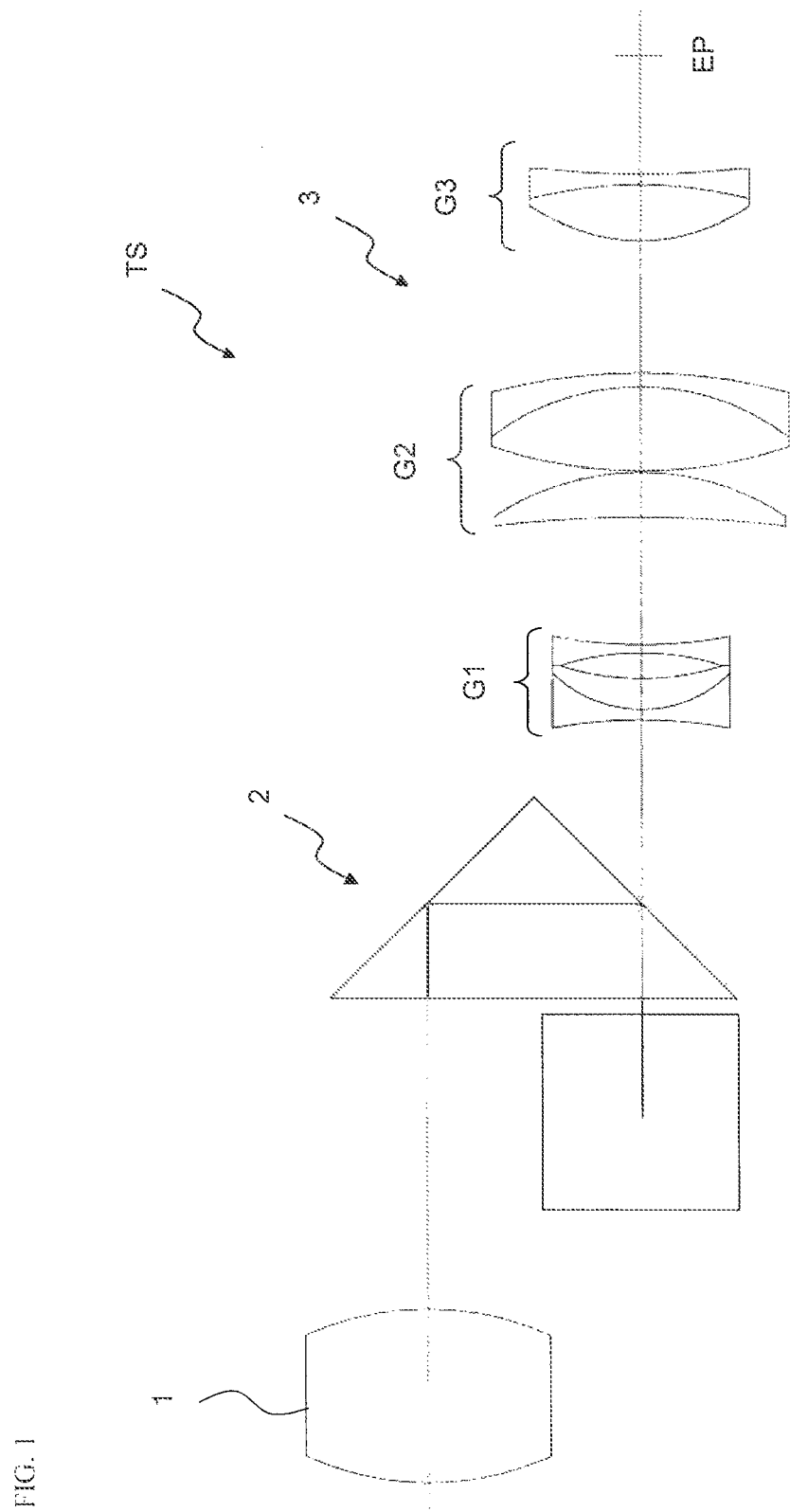
FIG. 1 is a diagram illustrating a configuration of a telescope optical system as an optical instrument including an ocular zoom optical system.

Hereinafter, a preferred embodiment of the present invention will be described with reference to drawings. First, a telescope optical system TS shown in FIG. 1 will be described as an example of an optical system of an optical instrument including an ocular zoom optical system according to this embodiment. The telescope optical system TS includes, in order from the object side: an objective lens 1 forming an image (intermediate image) of an object to be observed; a prism 2 converting an inverted image formed by the objective lens 1 into an erected image; and an ocular zoom optical system 3 that collects light from the intermediate image formed by the objective lens 1 for allowing an observing eye positioned at an eye point EP to observe an image of the object in an enlarged manner.

Figure 2A:
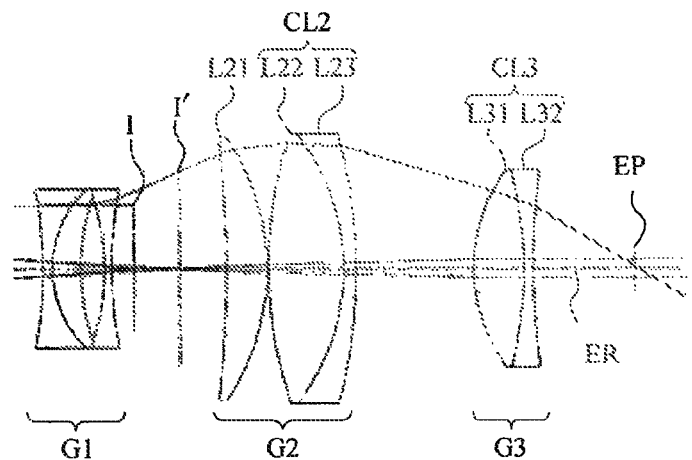
FIG. 2(a) shows a low power end state.
Figure 2B:
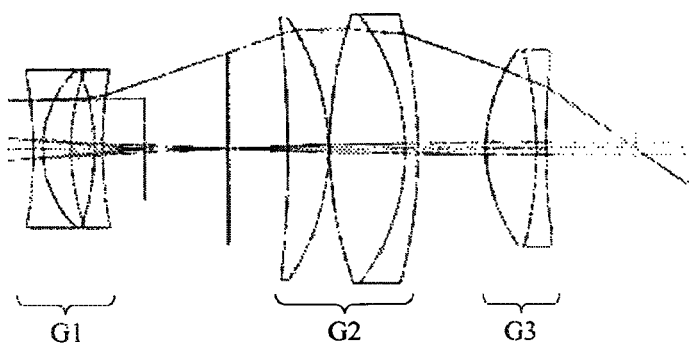
FIG. 2(b) shows an intermediate focal length state.
Figure 2C:
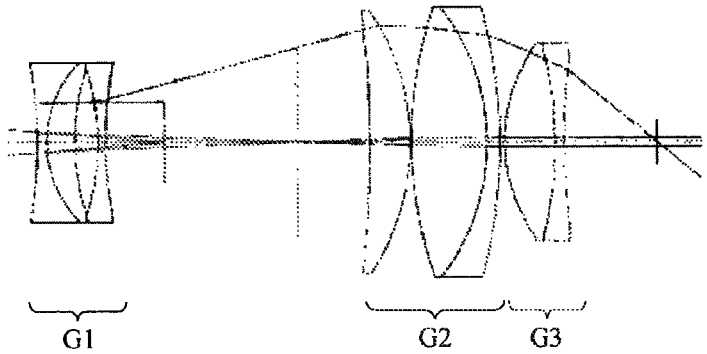
FIG. 2(c) shows a high power end state.

Here, as shown in FIG. 2, the ocular zoom optical system 3 according to this embodiment includes a first lens group G1 having a negative refractive power, a second lens group G2 having a positive refractive power, and a third lens group G3 having a positive refractive power, in order from the object side. The ocular zoom optical system 3 is arranged such that an image (intermediate image) I of an object is formed by the objective lens 1 between the first lens group G1 and the second lens group G2. Thus, the intermediate image I of the objective lens 1 is formed at a position I'.

In the ocular zoom optical system 3, during zooming, the third lens group G3 is fixed on the optical axis, and the first lens group G1 and the second lens group G2 are moved along the optical axis in directions opposite to each other with the intermediate image I' formed between the lens groups G1 and G2 interposed therebetween. In the ocular zoom optical system 3 shown in FIG. 2, the first lens group G1 is moved to the object side along the optical axis and the second lens group G2 is moved to the eye-point side along the optical axis during zooming from a low power end state to a high power end state.

In the ocular zoom optical system 3, the second lens group G2 includes, in order from the object side: a positive single lens (a positive meniscus lens L21 with its convex surface on the eye-point side in FIG. 2) whose lens surface on the eye-point side has a higher positive refractive power than the lens surface on the object side has; and a positive cemented lens (a cemented lens CL2 in FIG. 2) including a positive lens (a biconvex lens L22 in FIG. 2) and a negative lens (a negative meniscus lens L23 with its convex surface on the eye-point side).

In the ocular zoom optical system 3 having such a configuration, as is apparent from FIG. 2 and the like, the second lens group G2 is a lens group where a ray passes through a position farthest from the optical axis, and has a high refractive power. Thus, zooming affects variation in aberration. Accordingly, in order to suppress variation in aberration, appropriate power arrangement and selection of Abbe number are required. In the ocular zoom optical system 3, when the focal length of the second lens group G2 is defined as f2, and the focal length of the single lens L21 is defined as f21, it is preferable that the following conditional expression (1) is satisfied.

$$2.1 < f21/f2 < 2.8 \quad (1)$$

The conditional expression (1) defines the appropriate refractive power of the single lens L21 in the second lens group G2. If the upper limit in the conditional expression (1) is exceeded, the refractive power of the single lens L21 is insufficient, and a ray passes through high positions on lenses thereafter on the low power side. Accordingly, correction of the lateral chromatic aberration tends to be excessive. If the lower limit of the conditional expression (1) is fallen below, correction of the spherical aberration of the pupil becomes difficult particularly on the high power side, and a sufficient eye relief ER cannot be secured. The eye relief ER is the distance on the optical axis from the lens surface on the most eye-point EP side of the ocular zoom optical system 3 to the eye point EP.

In the ocular zoom optical system 3, when the Abbe number of the medium of the single lens L21 is defined as vd21, it is preferable that the following conditional expression (2) is satisfied.

$$vd21 > 55 \quad (2)$$

The conditional expression (2) defines the appropriate Abbe number of the medium of the single lens L21 in a range of the conditional expression (1). When the lower limit of the conditional expression (2) is fallen below, the dispersion of the medium of the single lens L21 is increased. Accordingly, in the cemented positive lens CL2 for achromatism, variation in incident height according to wavelength is increased. The angle of deviation in the single lens L21 is changed also by the position according to zooming. As a result, variation in lateral chromatic aberration due to zooming is increased.

When the focal length of the second lens group G2 is defined as f2, the focal length of the second lens group G2 for C-line ($\lambda$=656.3 nm) is defined as fC2, and the focal length for F-line (λ=486.1 nm) is defined as fF2, it is preferable that the ocular zoom optical system 3 satisfies the following conditional expression (3)

$$f2/(fC2-fF2)>90 \tag{3}$$

The conditional expression (3) is a condition for reducing the variation in lateral chromatic aberration due to zooming. When the lower limit of the conditional expression (3) is fallen below, the variation in lateral chromatic aberration due to zooming is increased.

In the ocular zoom optical system 3 according to this embodiment, the single lens L21 of the second lens group G2 is a lens with its convex surface on the eye-point side (for example, a positive meniscus lens). When the radius of curvature on the object side is defined as ra, and the radius of curvature on the eye-point side is defined as rb, it is preferable that the following conditional expression (4) is satisfied.

$$-2.2 \leq (rb+ra)/(rb-ra) \leq -1.0 \tag{4}$$

The conditional expression (4) represents a condition for balancing the spherical aberration of the pupil, the distortion and the astigmatism mainly on the high power end. When the upper limit of the conditional expression (4) is exceeded, the spherical aberration of the pupil is reduced but correction of the distortion becomes difficult. When the lower limit of the conditional expression (4) is fallen below, the correction of the astigmatism becomes insufficient and the burden on the other lenses is increased.

In the ocular zoom optical system 3 of this embodiment, the third lens group G3 is a cemented lens (a cemented lens CL3 in FIG. 2) that includes, in order from the object side: a positive lens (for example, a biconvex lens L31 in FIG. 2) whose lens surface on the object side has a higher refractive power than the lens surface on the eye-point side has; and a biconcave lens (the biconcave lens L32 in FIG. 2). When the refractive index of the medium of the positive lens L31 included in the third lens group G3 for d-line (λ=587.6 nm) is defined as nd31 and the Abbe number is defined as vd31, it is preferable that the ocular zoom optical system 3 satisfies the following conditional expressions (5) and (6)

$$1.65 < nd31 < 1.74 \tag{5}$$

$$vd31 > 50 \tag{6}$$

In order to correct the spherical aberration of the pupil and the distortion, the radius of curvature is required to set such that the angle of deviation of an off-axis ray in the third lens group G3 is reduced. When the radius of curvature of the lens surface on the object side of the positive lens L31 is reduced and the radius of curvature of the lens surface on the eye-point side of the biconcave lens L32 is increased, occurrence of the spherical aberration of the pupil and distortion can be reduced. However, when the radius of curvature of the lens surface on the object side of the positive lens L31 is reduced, variation in astigmatism due to zooming is increased.

The conditional expressions (5) and (6) represent conditions required to suppress variation of astigmatism due to zooming while correcting the spherical aberration of the pupil and distortion. When the upper limit of the conditional expression (5) is exceeded, the radius of curvature of the lens surface on the eye-point side of the biconcave lens L32 is reduced, and correction of the spherical aberration of the pupil and distortion becomes difficult. When the lower limit of the conditional expression (5) is fallen below, the radius of curvature of the lens surface on the object side of the biconcave lens L32 becomes too small, and variation in astigmatism is increased.

The conditional expression (6) represents a condition for appropriately correcting the chromatic aberration in the range of the conditional expression (5) When the lower limit of the conditional expression (6) is fallen below, correction of the chromatic aberration becomes difficult.

In the ocular zoom optical system 3 according to this embodiment, the lens surface on the object side of the positive lens L31 in the third lens group G3 has a configuration of an aspheric surface represented by the following expression (a), where the height in the direction perpendicular to the optical axis is h, the distance (sag amount) along the optical axis from the tangent plane on the lens vertex to the position on the plane with the height h is x(h), the reciprocal of the radius of curvature (paraxial radius of curvature) of a reference spherical surface is c, the conic constant is κ, and the n-th order coefficient of the aspheric surface is $C_n$.

[Expression 2]

$$x(h) = \frac{ch^2}{1 + \{1 - (\kappa+1)c^2h^2\}^{0.5}} + C_4 h^4 + C_6 h^6 \tag{a}$$

In this case, it is preferable that the ocular zoom optical system 3 satisfies the following conditional expression (7), with respect to the second derivative of the sag amount x of the lens surface on the object side of the positive lens L31, in the range of 0≤h≤15.

[Expression 3]

$$\frac{c}{(1+0.2c^2h^2)^{1.5}} \leq \frac{d^2x}{dh^2} \leq \frac{c}{(1-0.6c^2h^2)^{1.5}} \tag{7}$$

The conditional expression (7) represents a condition for favorably correcting astigmatism and achieving extension of the eye relief ER and suppression of the spherical aberration of the pupil. When the upper limit of the conditional expression (7) is exceeded, the refractive power of the positive lens L31 for off-axis light becomes too high, the eye relief ER is reduced, and the spherical aberration of the pupil occurs. Furthermore, when the lower limit of the conditional expression (7) is fallen below, astigmatism occurs.

When the focal length of the entire system in the high power end state (minimum focal length) is defined as fm, the focal length of the first lens group G1 is defined as f1, the focal length of the second lens group G2 is defined as f2, and the focal length of the third lens group G3 is defined as f3, it is preferable that the ocular zoom optical system 3 according to this embodiment satisfies the following conditional expressions (8) to (10).

$$2.5 < (-f1)/fm < 3.0 \tag{8}$$

$$3.2 < f2/fm < 4.0 \tag{9}$$

$$5.0 < f3/fm < 6.2 \tag{10}$$

The conditional expressions (8) to (10) normalize the focal lengths f1 to f3 of the lens groups G1 to G3 with respect to the focal length (minimum focal length) fm of the entire ocular zoom optical system 3 in the high power end state to thereby define an appropriate power allocation to the lens groups G1 to G3.

When the upper limit of the conditional expression (8) is exceeded, the refractive power of the first lens group G1 is reduced, the zooming effect of the first lens group G1 is reduced. As a result, the burden on the second lens group G2 according to zooming is excessively increased, and the balance of aberrations is degraded. Furthermore, the angle of the off-axis ray exiting from the first lens group G1 is reduced. Accordingly, the off-axis ray passes through low positions as a whole, and the eye relief ER is insufficient. When the lower limit of the conditional expression (8) is fallen below, the refractive power of the first lens group G1 becomes too high and correction of coma becomes difficult. Furthermore, since the angle of the off-axis ray exiting from the first lens group G1 becomes large, the diameters of lenses thereafter are increased.

When the upper limit of the conditional expression (9) is exceeded, the combined principal point of the second lens group G2 and the third lens group G3 is moved to the eye-point side. Accordingly, on the low power side, the distance between the intermediate image I' and the second lens group G2 becomes too small, and dusts and flaws on the lens surfaces inappropriately become more visible. When the lower limit of the conditional expression (9) is fallen below, the refractive power of the second lens group G2 becomes too high, and the astigmatism and spherical aberration of the pupil are increased. Furthermore, it becomes difficult to secure a sufficient eye relief ER.

When the upper limit of the conditional expression (10) is exceeded, the combined principal point of the second lens group G2 and the third lens group G3 is moved to the eye-point side. Accordingly, dusts and flaws on the lens surfaces become more visible. When the lower limit of the conditional expression (10) is fallen below, the refractive power of the third lens group G3 becomes excessive, and variation in astigmatism is increased.

EXAMPLES

Four examples of the ocular zoom optical system 3 will now be described below.

First Example

Figure 3:
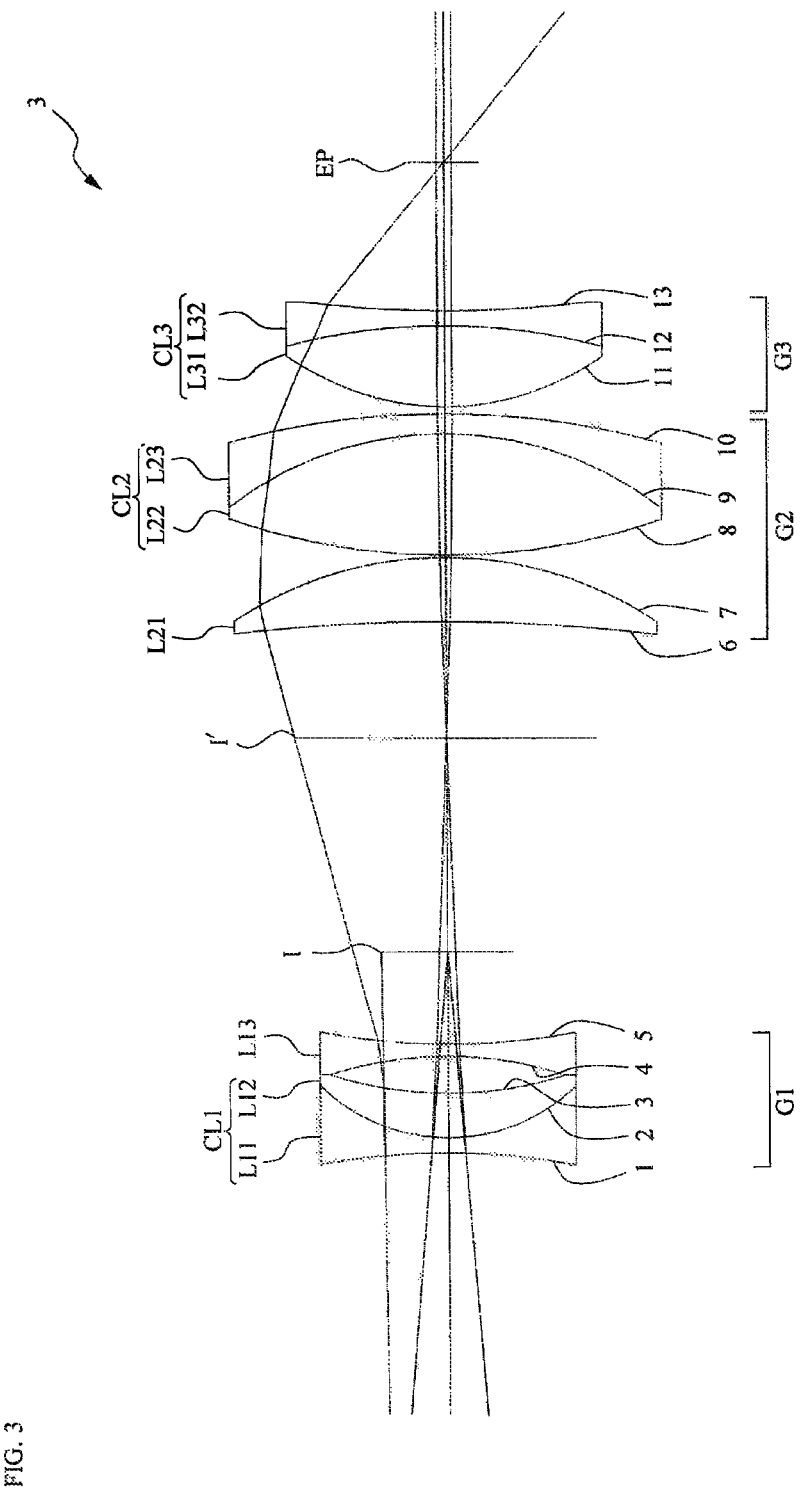
FIG. 3 is a lens configuration diagram showing an ocular zoom optical system according to a first example.

FIG. 3 shows an ocular zoom optical system 3 according to a first example. The ocular zoom optical system 3 according to the first example includes, in order from the object side: a first lens group G1 having a negative refractive power; a second lens group G2 having a positive refractive power; and a third lens group G3 having a positive refractive power. An intermediate image I' of an object to be observed is formed between the first lens group G1 and the second lens group G2. The first lens group G1 includes, in order from the object side: a cemented lens CL1 including a biconcave lens L11 and a positive meniscus lens L12 with its convex surface on the object side; and a biconcave lens L13. The second lens group G2 includes, in order from the object side: a positive meniscus lens (positive single lens) L21 with its concave surface on the object side; and a cemented lens (positive cemented lens) CL2 including a biconvex lens (positive lens) L22 and a negative meniscus lens (negative lens) L23 with its convex surface on the eye-point side. The third lens group G3 is a cemented lens CL3 including a biconvex lens (positive lens) L31 and a biconcave lens L32 in order from the object side.

In the ocular zoom optical system 3 according to the first example, the positive meniscus lens (positive single lens) L21 included in the second lens group G2 has a higher positive refractive power on the lens surface (seventh surface) on the eye-point side than on the lens surface (sixth surface) on the object side. The biconvex lens (positive lens) L31 included in the third lens group G3 has a higher refractive power on the lens surface (eleventh surface) on the object side than that on the lens surface (twelfth surface) on the eye-point side. This lens surface on the object side has an aspheric surface shape.

The following Table 1 shows the specifications of the ocular zoom optical system 3 according to the first example shown in FIG. 3. In this Table 1, f denotes the focal length of the entire ocular zoom optical system 3, 2ω denotes the angle of view (apparent field of view) of the ocular zoom optical system 3, and ER denotes an eye relief. In Table 1, a first column m represents a number of each optical surface from the object side, a second column r represents the radius of curvature of each optical surface, a third column d represents the distance (surface separation) on the optical axis from each optical surface to the next optical surface, a fourth column nd represents the refractive index for d-line, and a fifth column vd represents the Abbe number. Here, the refractive index of air, 1.000, is omitted. The lens surfaces formed into aspheric surface shapes are assigned with "*" laterally adjacent to the surface numbers of the lens surfaces. The aspheric surface shape is represented by the expression (a). The following Table 1 shows the values of the conic constant κ and the coefficient of the aspheric surface $C_n$ used in the aspheric surface expression (a).

Here, the unit of length of the radius of curvature r, the surface separation d, the focal length f and the like described in all the specifications is generally "mm", unless otherwise indicated. Note that, since the optical system has an equivalent optical performance if being proportionally enlarged or proportionally reduced, the unit is not limited to "mm" but another appropriate unit can be employed instead.

TABLE 1

| Entire specifications |
|---|
| f = 17.5 to 8.75 |
| 2ω = 64.0° to 80.0° |
| ER = 17.2 to 15.1 |

| Lens data | | | | |
|---|---|---|---|---|
| m | r | d | nd | vd |
| 1 | −66.438 | 1.5 | 1.5168 | 64.1 |
| 2 | 17.5 | 4.5 | 1.7174 | 29.5 |
| 3 | 36.5 | 3.7 | | |
| 4 | −36.5 | 1.2 | 1.5168 | 64.1 |
| 5 | 64.0 | d1 | | |
| 6 | −170.0 | 6.5 | 1.6516 | 58.5 |
| 7 | −36.5 | 0.2 | | |
| 8 | 64.0 | 12.2 | 1.7292 | 54.7 |
| 9 | −34.0 | 2.0 | 1.8052 | 25.4 |
| 10 | −80.0 | d2 | | |
| 11* | 24.468 | 8.1 | 1.6935 | 53.2 |
| 12 | −60.0 | 1.5 | 1.8052 | 25.4 |
| 13 | 114.92 | ER | | |

| Aspheric surface data | | | |
|---|---|---|---|
| eleventh surface | κ = −0.72 | $C_4 = 0$ | $C_6 = 0$ |

As described above, in the ocular zoom optical system 3 according to this first example, during zooming, the third lens group G3 is fixed on the optical axis, and the first lens group G1 and the second lens group G2 are moved on the optical axis. Accordingly, an air space d1 between the first lens group G1 and the second lens group G2 on the optical axis, an air space d2 between the second lens group G2 and the third lens group G3 on the optical axis, and the eye relief ER are changed. The following Table 2 shows the focal length and separation of the ocular zoom optical system 3, that is, the focal length f of the entire system, the distance Ff on the optical axis between the vertex of the first surface of the ocular zoom optical system 3 and the position of the front focus (i.e., the position of the object image I of the objective lens 1) in the case of ray tracing from the object side, the lens group separations d1 and d2, and the eye relief ER. The values are in the cases of the low power end state, the intermediate focal length state and the high power end state of the ocular zoom optical system 3. The description is analogous also on the following examples.

TABLE 2

Focal length and separation

| f | Ff | d1 | d2 | ER |
|---|---|---|---|---|
| 17.5 | 14.49 | 18.44 | 18.89 | 17.2 |
| 12.4 | 17.70 | 29.70 | 10.83 | 14.7 |
| 8.75 | 20.16 | 42.30 | 0.70 | 15.1 |

The following Table 3 shows values corresponding to the conditional expressions (1) to (10) in the ocular zoom optical system 3 according to this first example. In Table 3, f1 denotes the focal length of the first lens group G1, f2 denotes the focal length of the second lens group G2, f3 denotes the focal length of the third lens group G3, f21 denotes the focal length of the single lens L21 of the second lens group G2. As to the conditional expression (7), the value of $d^2x/dh^2$ in the case where the value of h is changed from 0.0 to 15.0 in increments of 1.0, and the lower limit (left side) and the upper limit (right side) of the conditional expression (7). The description is analogous also in the following examples.

TABLE 3 f1 = −25.3
f2 = 31.2
f3 = 48.0
f21 = 70.0

Condition corresponding values

| (1) | f21/f2 = 22 |
| (2) | vd21 = 58.5 |
| (3) | f2/(fC2 − fF2) = 100.2 |
| (4) | (rb + ra)/(rb − ra) = −1.5 |
| (5) | nd31 = 1.69 |
| (6) | vd31 = 53.2 |

| (7) | h | $d^2x/dh^2$ | lower limit (left side) | upper limit (right side) |
|---|---|---|---|---|
| | 0.0 | 0.04087 | 0.04087 | 0.04087 |
| | 1.0 | 0.04090 | 0.04085 | 0.04093 |
| | 2.0 | 0.04098 | 0.04079 | 0.04112 |
| | 3.0 | 0.04113 | 0.04069 | 0.04143 |
| | 4.0 | 0.04133 | 0.04054 | 0.04187 |
| | 5.0 | 0.04160 | 0.04036 | 0.04246 |
| | 6.0 | 0.04192 | 0.04014 | 0.04319 |
| | 7.0 | 0.04232 | 0.03989 | 0.04408 |
| | 8.0 | 0.04278 | 0.03959 | 0.04514 |
| | 9.0 | 0 04331 | 0.03927 | 0.04640 |
| | 10.0 | 0.04391 | 0.03890 | 0.04788 |
| | 11.0 | 0.04460 | 0.03851 | 0.04962 |
| | 12.0 | 0.04538 | 0.03809 | 0.05163 |
| | 13.0 | 0.04624 | 0.03764 | 0.05399 |
| | 14.0 | 0.04721 | 0.03716 | 0.05674 |
| | 15.0 | 0.04829 | 0.03666 | 0.05996 |
| (8) | (−f1)/fm = 2.9 | | | |
| (9) | f2/fm = 3.6 | | | |
| (10) | f3/fm = 5.5 | | | |

Thus, in the first example, the conditional expressions (1) to (10) are satisfied.

Figure 4A:
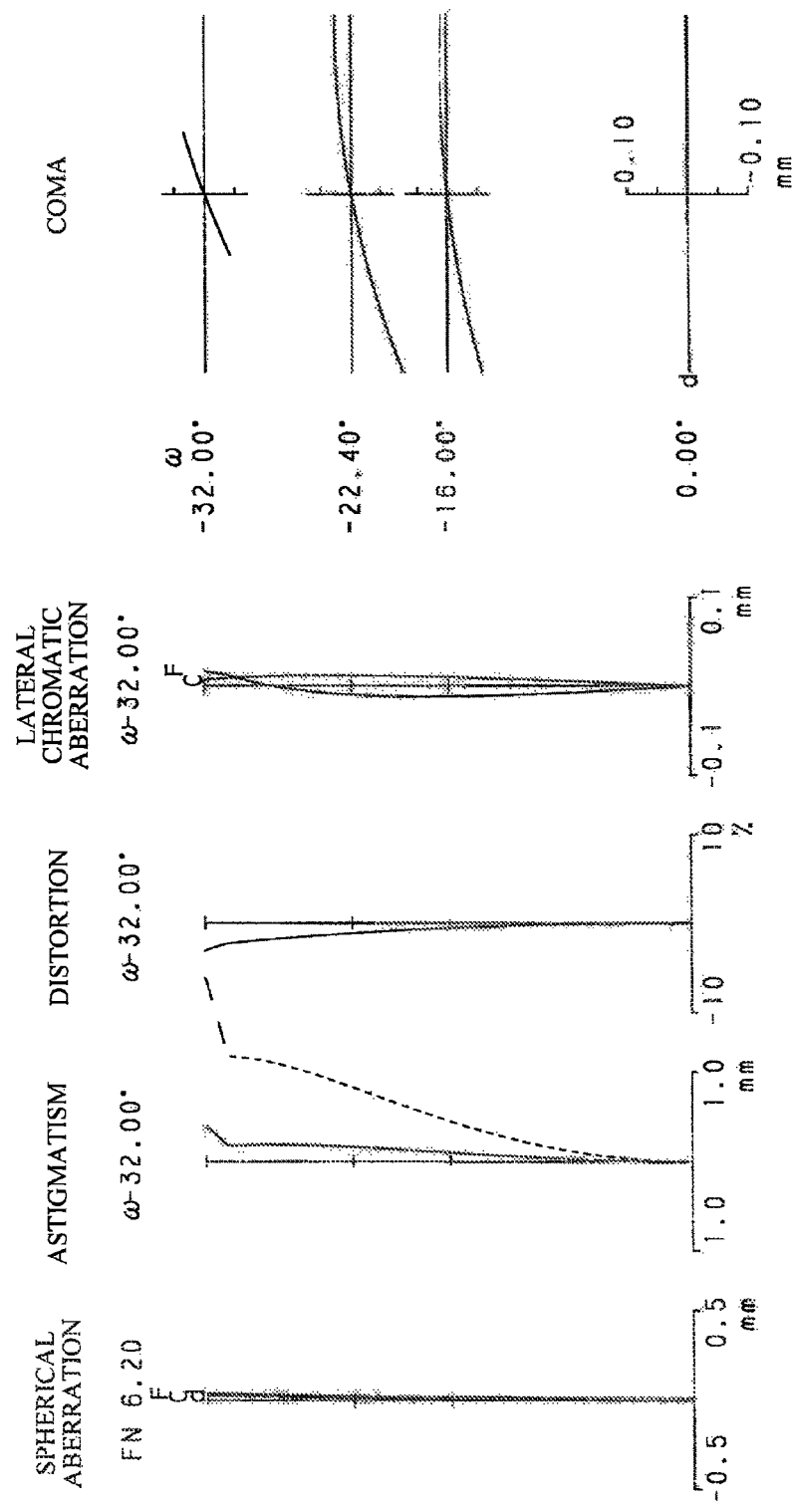
FIG. 4(a) shows a low power end state.
Figure 4B:
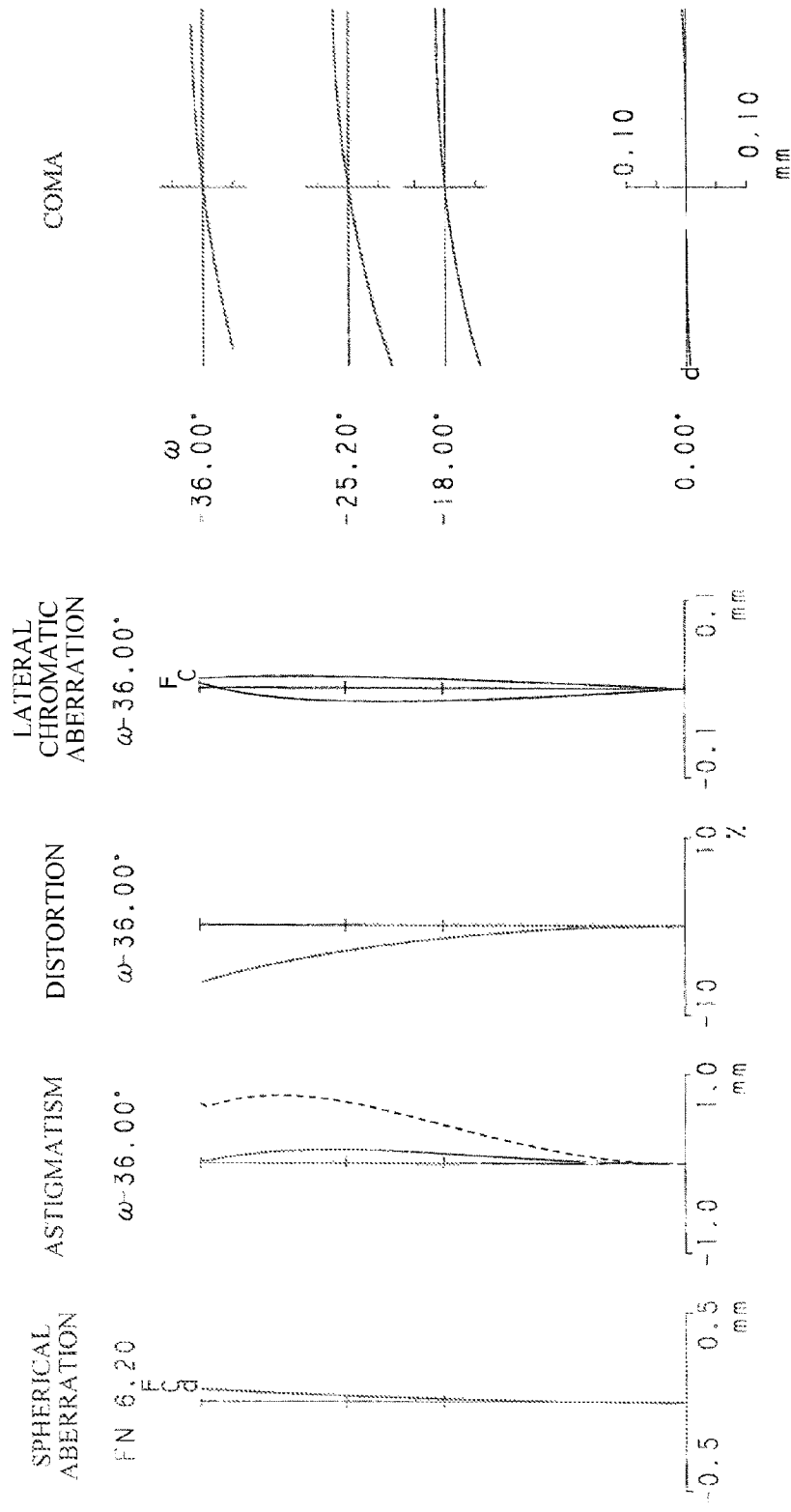
FIG. 4(b) shows an intermediate focal length state.

FIG. 4 shows diagrams of aberrations including the spherical aberration, astigmatism, distortion, lateral chromatic aberration and coma of the ocular zoom optical system 3 of the first example in the low power end state, the intermediate focal length state and the high power end state. Here, the spherical aberration diagram shows aberrations for rays of d-line, F-line and C-line. The lateral chromatic aberration diagram shows aberrations for rays of F-line and C-line. The astigmatism diagram, the distortion diagram and the coma diagram show aberrations for rays of d-line. The spherical aberration diagram shows the aberration for F number FN. The astigmatism diagram, the distortion diagram, the lateral chromatic aberration diagram and the coma diagram show aberrations for the half angle of view ω. In the astigmatism diagram, a solid line shows a sagittal image plane, and a broken line shows a meridional image plane for each wavelength. The description on these diagrams of aberrations is analogous also in the following examples. As is apparent from each aberration diagram shown in FIG. 4, the ocular zoom optical system 3 according to this first example has a wide apparent field of view of at least 60° on the low power side. The aberrations are favorably corrected while a sufficient eye relief is secured over the entire zoom range.

Second Example

Figure 5:
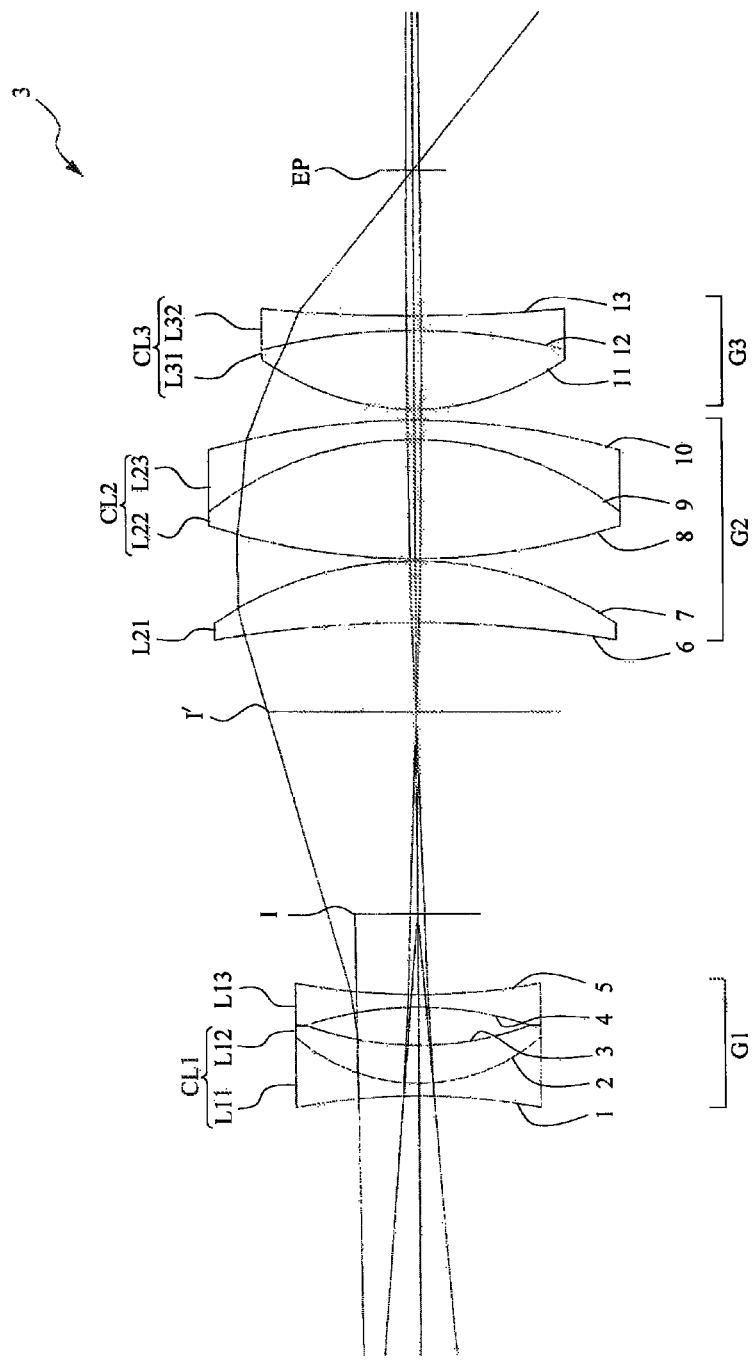
FIG. 5 is a lens configuration diagram showing an ocular zoom optical system according to a second example.

FIG. 5 shows an ocular zoom optical system 3 according to a second example. The ocular zoom optical system 3 according to the second example includes, in order from the object side: a first lens group G1 having a negative refractive power; a second lens group G2 having a positive refractive rower; and a third lens group G3 having a positive refractive power. An intermediate image I' of an object to be observed is formed between the first lens group G1 and the second lens group G2. The first lens group G1 includes, in order from the object side: a cemented lens CL1 including a biconcave lens L11 and a positive meniscus lens L12 with its convex surface on the object side; and a biconcave lens L13. The second lens group G2 includes, in order from the object side: a positive meniscus lens (positive single lens) L21 with its concave surface on the object side; and a cemented lens (positive cemented lens) CL2 including a biconvex lens (positive lens) L22 and a negative meniscus lens (negative lens) L23 with its convex surface on the eye-point EP side. The third lens group G3 is a cemented lens CL3 including a biconvex lens (positive lens) L31 and a biconcave lens L32 in order from the object side.

In the ocular zoom optical system 3 according to the second example, the positive meniscus lens (positive single lens) L21 included in the second lens group G2 has a higher positive refractive power on the lens surface (seventh surface) on the eye-point side than that on the lens surface (sixth surface) on the object side. The biconvex lens (positive lens) L31 included in the third lens group G3 has a higher refractive power on the lens surface (eleventh surface) on the object side than that on the lens surface (twelfth surface) on the eye-point side. This lens surface on the object side has an aspheric surface shape.

The following Table 4 shows specifications of the ocular zoom optical system 3 according to the second example shown in FIG. 5. In the aspheric surface data, "E-n" denotes "$\times 10^{-n}$".

TABLE 4

Entire specifications f = 17.5 to 8.75
2ω = 63.0° to 79.0°
ER = 19.4 to 15.4

Lens data

| m | r | d | nd | vd |
|---|---|---|---|---|
| 1 | −66.0 | 1.3 | 1.51680 | 64.1 |
| 2 | 18.5 | 4.0 | 1.76182 | 26.6 |
| 3 | 32.884 | 4.0 | | |
| 4 | −35.308 | 1.3 | 1.51680 | 64.1 |
| 5 | 66.0 | d1 | | |
| 6 | −117.05 | 6.5 | 1.65160 | 58.5 |
| 7 | −35.308 | 0.2 | | |
| 8 | 66.0 | 12.5 | 1.72916 | 54.7 |
| 9 | −32.884 | 2.0 | 1.80518 | 25.4 |
| 10 | −71.95 | d2 | | |
| 11* | 24.0 | 8.2 | 1.67798 | 54.9 |
| 12 | −60.0 | 1.5 | 1.80518 | 25.4 |
| 13 | 161.05 | ER | | |

Aspheric surface data

| eleventh surface | κ = 0 | $C_4$ = −6.3E−6 | $C_6$ = −1.3E−8 |
|---|---|---|---|

As described above, in the ocular zoom optical system 3 according to this second example, during zooming, the third lens group G3 is fixed on the optical axis, and the first lens group G1 and the second lens group G2 are moved on the optical axis. Accordingly, an air space d1 between the first lens group G1 and the second lens group G2 on the optical axis, an air space d2 between the second lens group G2 and the third lens group G3 on the optical axis, and the eye relief ER are changed. The following Table 5 shows the focal lengths and separations of the ocular zoom optical system 3 according to second example.

TABLE 5

Focal length and separation

| f | Ff | d1 | d2 | ER |
|---|---|---|---|---|
| 17.5 | 13.65 | 15.94 | 18.64 | 19.4 |
| 12.4 | 16.70 | 26.83 | 10.81 | 16.0 |
| 8.75 | 19.03 | 38.84 | 1.12 | 15.4 |

The following Table 6 shows values corresponding to the conditional expressions (1) to (10) of the ocular zoom optical system 3 of this second example.

TABLE 6 f1 = −24.0
f2 = 31.5
f3 = 45.0
f21 = 75.2

Condition corresponding values

| (1) | f21/f2 = 2.4 |
| (2) | vd21 = 58.5 |
| (3) | f2/(fC2 − fF2) = 99.3 |
| (4) | (rb + ra)/(rb − ra) = −1.9 |
| (5) | nd31 = 1.68 |
| (6) | vd31 = 54.9 |

TABLE 6-continued

| (7) | h | $d^2x/dh^2$ | lower limit (left side) | upper limit (right side) |
|---|---|---|---|---|
| | 0.0 | 0.04167 | 0.04167 | 0.04167 |
| | 1.0 | 0.04170 | 0.04164 | 0.04173 |
| | 2.0 | 0.04180 | 0.04158 | 0.04193 |
| | 3.0 | 0.04195 | 0.04147 | 0.04226 |
| | 4.0 | 0.04216 | 0.04132 | 0.04273 |
| | 5.0 | 0.04240 | 0.04113 | 0.04335 |
| | 6.0 | 0.04267 | 0.04090 | 0.04413 |
| | 7.0 | 0.04297 | 0.04063 | 0.04507 |
| | 8.0 | 0.04328 | 0.04032 | 0.04621 |
| | 9.0 | 0.04362 | 0.03997 | 0.04756 |
| | 10.0 | 0.04400 | 0.03959 | 0.04914 |
| | 11.0 | 0.04449 | 0.03917 | 0.05100 |
| | 12.0 | 0.04518 | 0.03873 | 0.05317 |
| | 13.0 | 0.04624 | 0.03825 | 0.05571 |
| | 14.0 | 0.04796 | 0.03775 | 0.05869 |
| | 15.0 | 0.05084 | 0.03722 | 0.06220 |
| (8) | (−f1)/fm = 2.7 | | | |
| (9) | f2/fm = 3.6 | | | |
| (10) | f3/fm = 5.1 | | | |

Thus, in the second example, the conditional expressions (1) to (10) are satisfied.

Figure 6A:
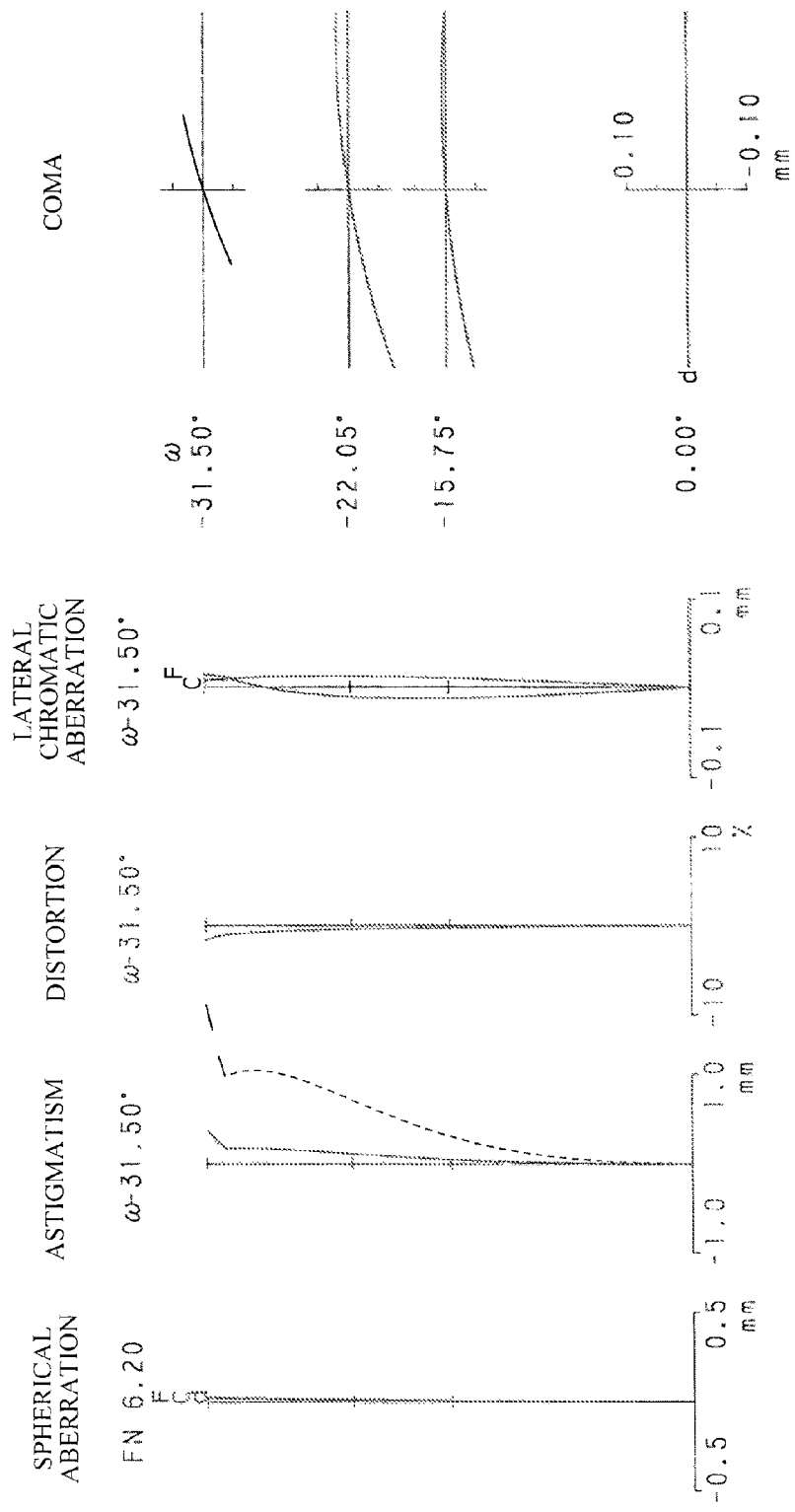
FIG. 6(a) shows a low power end state.
Figure 6B:
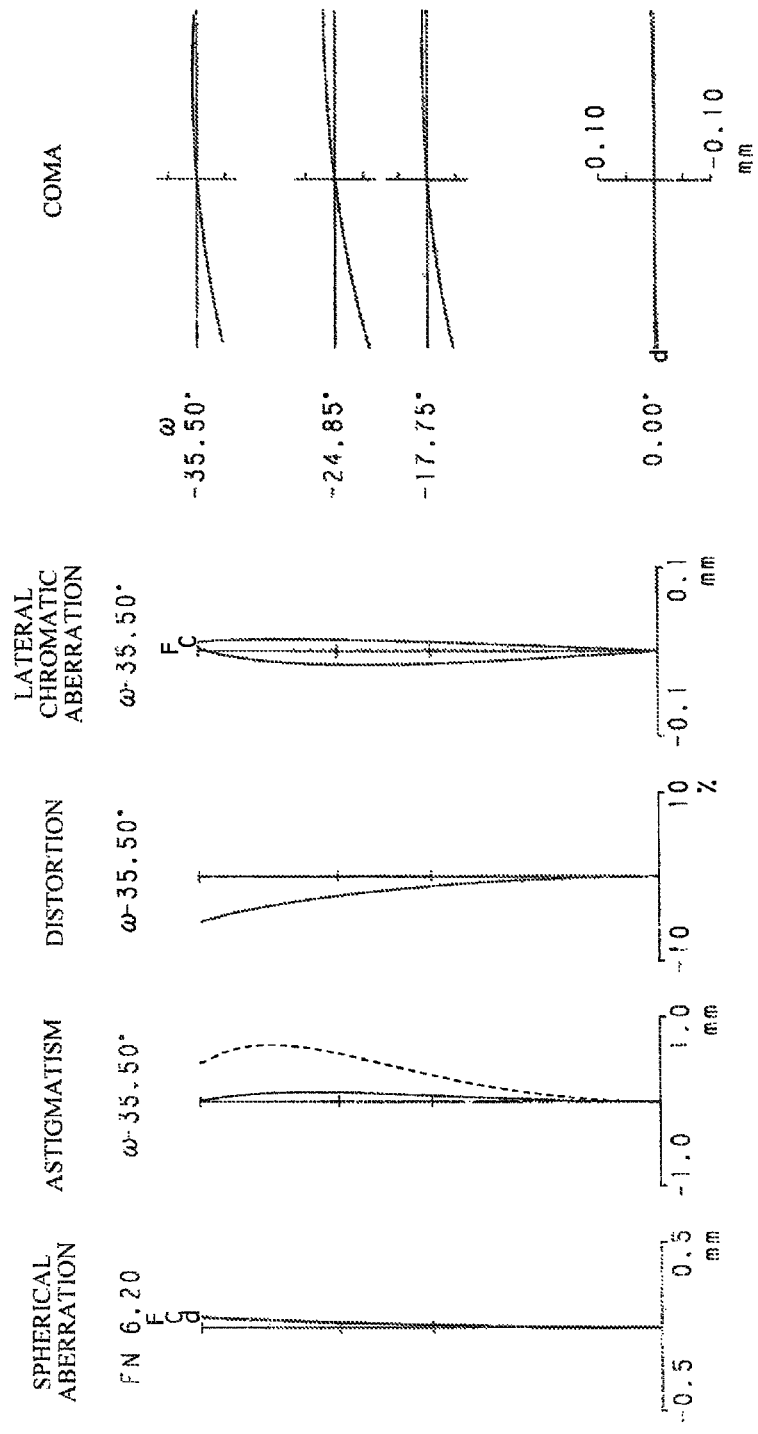
FIG. 6(b) shows an intermediate focal length state.
Figure 6C:
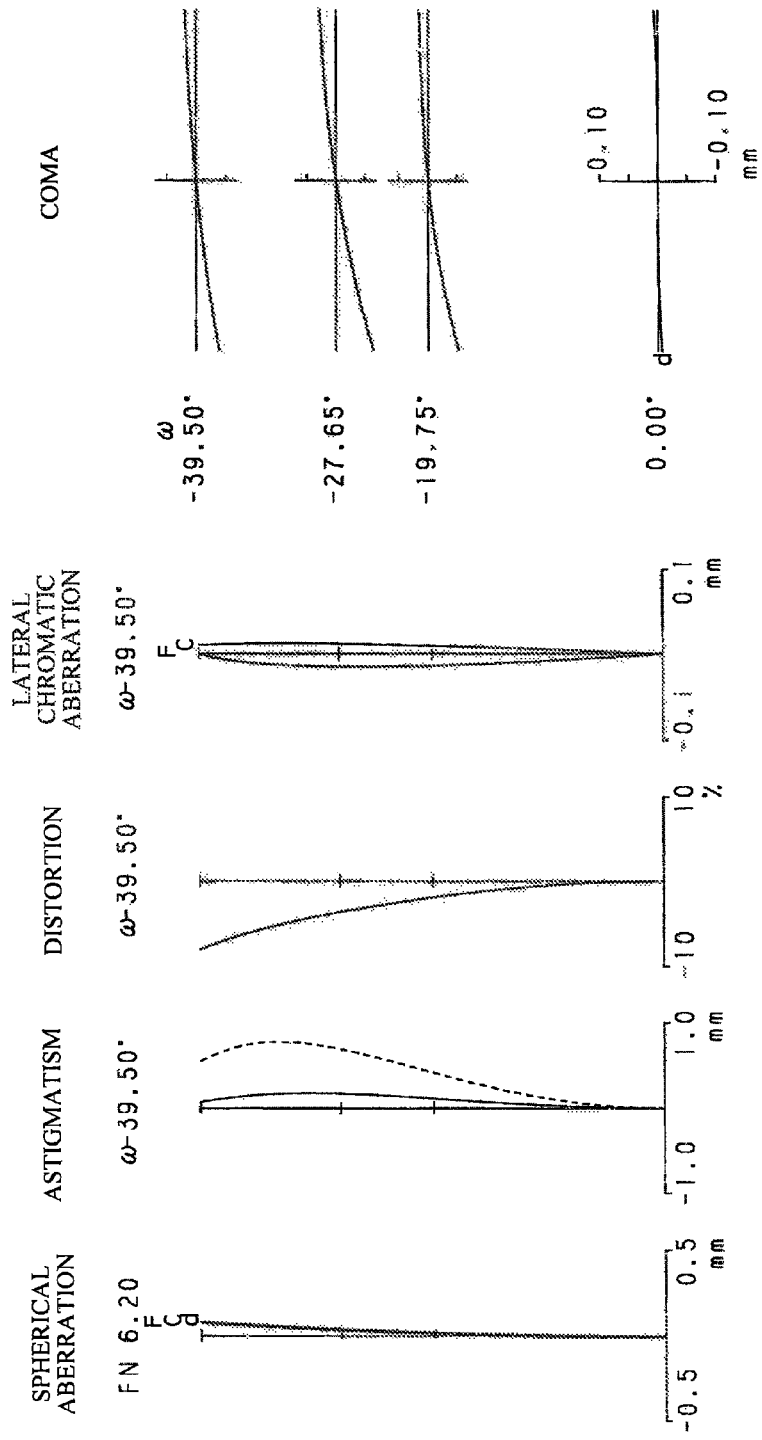
FIG. 6(c) shows a high power end state.

FIG. 6 shows diagrams of aberrations including the spherical aberration, astigmatism, distortion, lateral chromatic aberration and coma of the ocular zoom optical system 3 according to the second example in the low power end state, the intermediate focal length state and the high power end state. As is apparent from each aberration diagram shown in FIG. 6, the ocular zoom optical system 3 according to this second example has a wide apparent field of view of at least 60° on the low power side. The aberrations are favorably corrected while a sufficient eye relief is secured over the entire zoom range.

Third Example

Figure 7:
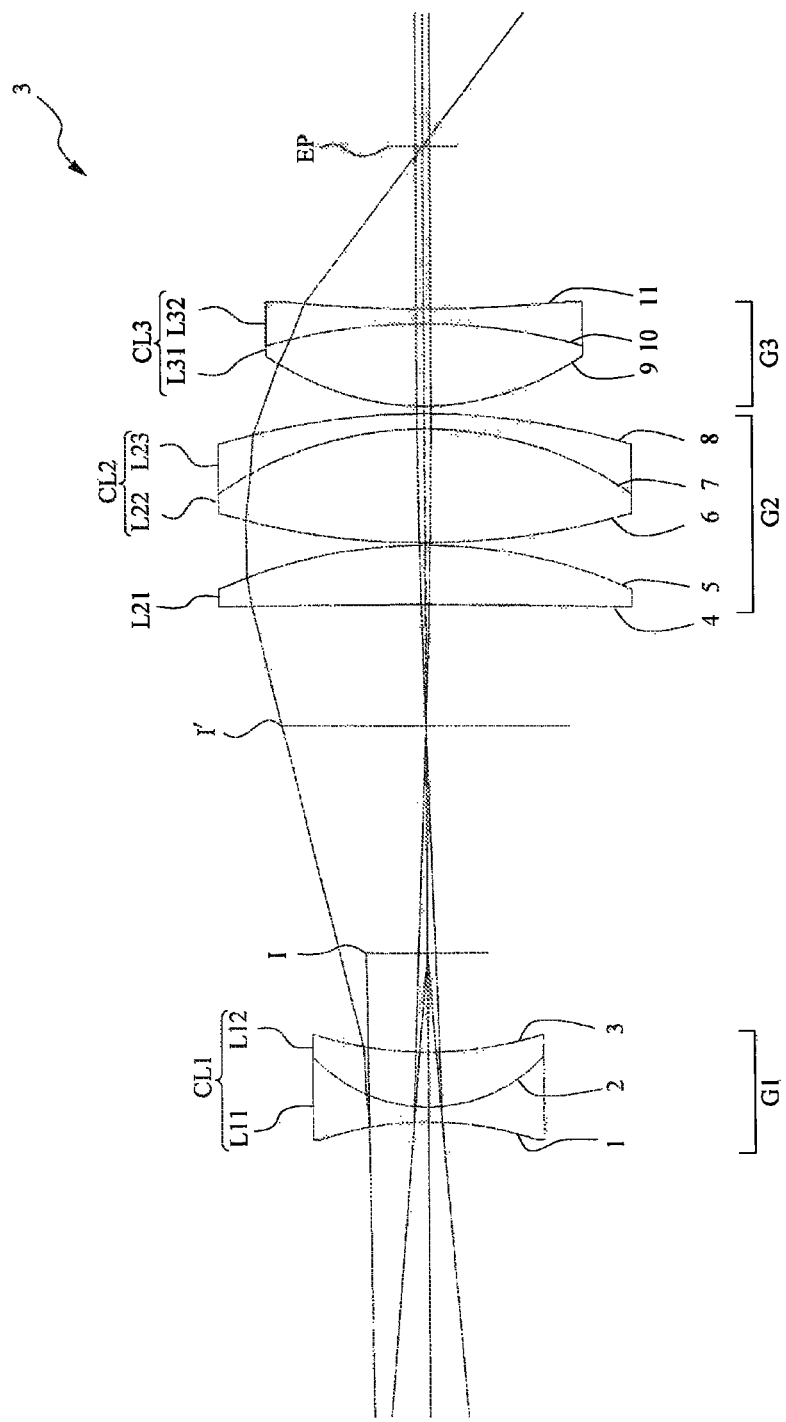
FIG. 7 is a lens configuration diagram showing an ocular zoom optical system according to a third example.

FIG. 7 shows an ocular zoom optical system 3 according to a third example. The ocular zoom optical system 3 according to the third example includes, in order from the object side: a first lens group G1 having a negative refractive power; a second lens group G2 having a positive refractive power; and a third lens group G3 having a positive refractive power. An intermediate image I' of an object to be observed is formed between the first lens group G1 and the second lens group G2. The first lens group G1 is a cemented lens CL1 including a biconcave lens L11 and a positive meniscus lens L12 with its convex surface on the object side in order from the object side. The second lens group G2 includes, in order from the object side: a positive meniscus lens (positive single lens) L21 with its concave surface on the object side; and a cemented positive lens CL2 including a biconvex lens (positive lens) L22 and a negative meniscus lens (negative lens) L23 with its convex surface on the eye-point EP side. The third lens group G3 is a cemented lens CL3 including a biconvex lens (positive lens) L31 and a biconcave lens L32 in order from the object side.

In the ocular zoom optical system 3 according to the third example, the positive meniscus lens (positive single lens) L21 included in the second lens group G2 has a higher positive refractive power on the lens surface (fifth surface) on the eye-point side than that on the lens surface (fourth surface) on the object side. The biconvex lens (positive lens) L31 included in the third lens group G3 has a higher refractive power on the lens surface (ninth surface) on the object side than that on the lens surface (tenth surface) on the eye-point side. This lens surface on the object side has an aspheric surface shape.

The following Table 7 shows specifications of the ocular zoom optical system 3 according to the third example shown in FIG. 7.

TABLE 7

Entire specifications f = 17.5 to 8.75
2ω = 60.0° to 76.0°
ER = 18.0 to 16.4

Lens data

| m | r | d | nd | νd |
|---|---|---|---|---|
| 1 | −32.0 | 1.5 | 1.7000 | 48.1 |
| 2 | 15.0 | 5.5 | 1.8052 | 25.4 |
| 3 | 36.1 | d1 | | |
| 4 | −1000.0 | 6.0 | 1.6204 | 60.3 |
| 5 | −48.5 | 0.2 | | |
| 6 | 70.0 | 11.5 | 1.7292 | 54.7 |
| 7 | −34.5 | 1.5 | 1.8052 | 25.4 |
| 8 | −68.77 | d2 | | |
| 9* | 24.468 | 8.2 | 1.6935 | 53.2 |
| 10 | −56.5 | 1.5 | 1.8052 | 25.4 |
| 11 | 131.88 | ER | | |

Aspheric surface data

| ninth surface | κ = −0.78 | $C_4 = 0$ | $C_6 = 0$ |
|---|---|---|---|

As described above, in the ocular zoom optical system 3 according to this third example, during zooming, the third lens group G3 is fixed on the optical axis, the first lens group G1 and the second lens group G2 are moved on the optical axis. Accordingly, an air space d1 between the first lens group G1 and the second lens group G2 on the optical axis, an air space d2 between the second lens group G2 and the third lens group G3 on the optical axis, and the eye relief ER are changed. The following Table 8 shows the focal lengths and separations of the ocular zoom optical system 3 according to this second example.

TABLE 8

Focal length and separation

| f | Ff | d1 | d2 | ER |
|---|---|---|---|---|
| 17.5 | 11.44 | 20.15 | 20.00 | 18.0 |
| 12.1 | 14.73 | 32.74 | 11.14 | 15.6 |
| 8.75 | 16.90 | 44.87 | 0.74 | 16.4 |

The following Table 9 shows values corresponding to the conditional expressions (1) to (10) of the ocular zoom optical system 3 according to this third example.

TABLE 9 f1 = −26.0
f2 = 32.8
f3 = 46.5
f21 = 82.0

Condition corresponding values

| (1) | f21/f2 = 2.5 |
| (2) | νd21 = 60 3 |
| (3) | f2/(fC2 − fF2) = 97.0 |
| (4) | (rb + ra)/(rb − ra) = −1.1 |
| (5) | nd31 = 1.69 |
| (6) | νd31 = 53.2 |

| (7) | h | $d^2x/dh^2$ | lower limit (left side) | upper limit (right side) |
|---|---|---|---|---|
| | 0.0 | 0.04087 | 0.04087 | 0.04087 |
| | 1.0 | 0.04089 | 0.04085 | 0.04093 |
| | 2.0 | 0.04096 | 0.04079 | 0.04112 |
| | 3.0 | 0.04107 | 0.04069 | 0.04143 |
| | 4.0 | 0.04123 | 0.04054 | 0.04187 |
| | 5.0 | 0.04144 | 0.04036 | 0.04246 |
| | 6.0 | 0.04169 | 0.04014 | 0.04319 |
| | 7.0 | 0.04200 | 0.03989 | 0.04408 |
| | 8.0 | 0.04236 | 0.03959 | 0.04514 |
| | 9.0 | 0.04276 | 0.03927 | 0.04640 |
| | 10.0 | 0.04323 | 0.03890 | 0.04788 |
| | 11.0 | 0.04376 | 0.03851 | 0.04962 |
| | 12.0 | 0.04434 | 0.03809 | 0.05163 |
| | 13.0 | 0.04500 | 0.03764 | 0.05399 |
| | 14.0 | 0.04572 | 0.03716 | 0.05674 |
| | 15.0 | 0.04652 | 0.03666 | 0.05996 |
| (8) | (−f1)/fm = 3.0 | | | |
| (9) | f2/fm = 3.7 | | | |
| (10) | f3/fm = 5.3 | | | |

Thus, in the third example, the conditional expressions (1) to (10) are satisfied.

Figure 8A:
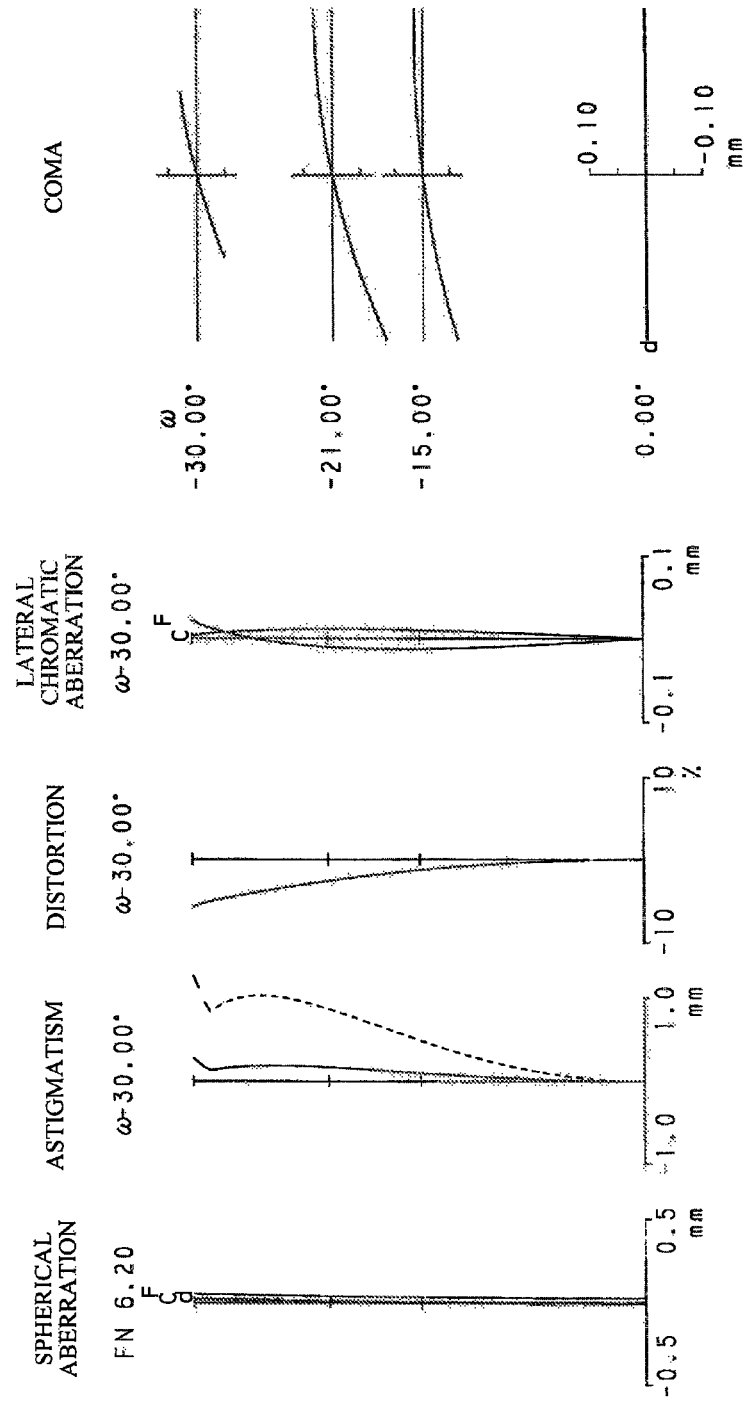
FIG. 8(a) shows a low power end state.
Figure 8B:
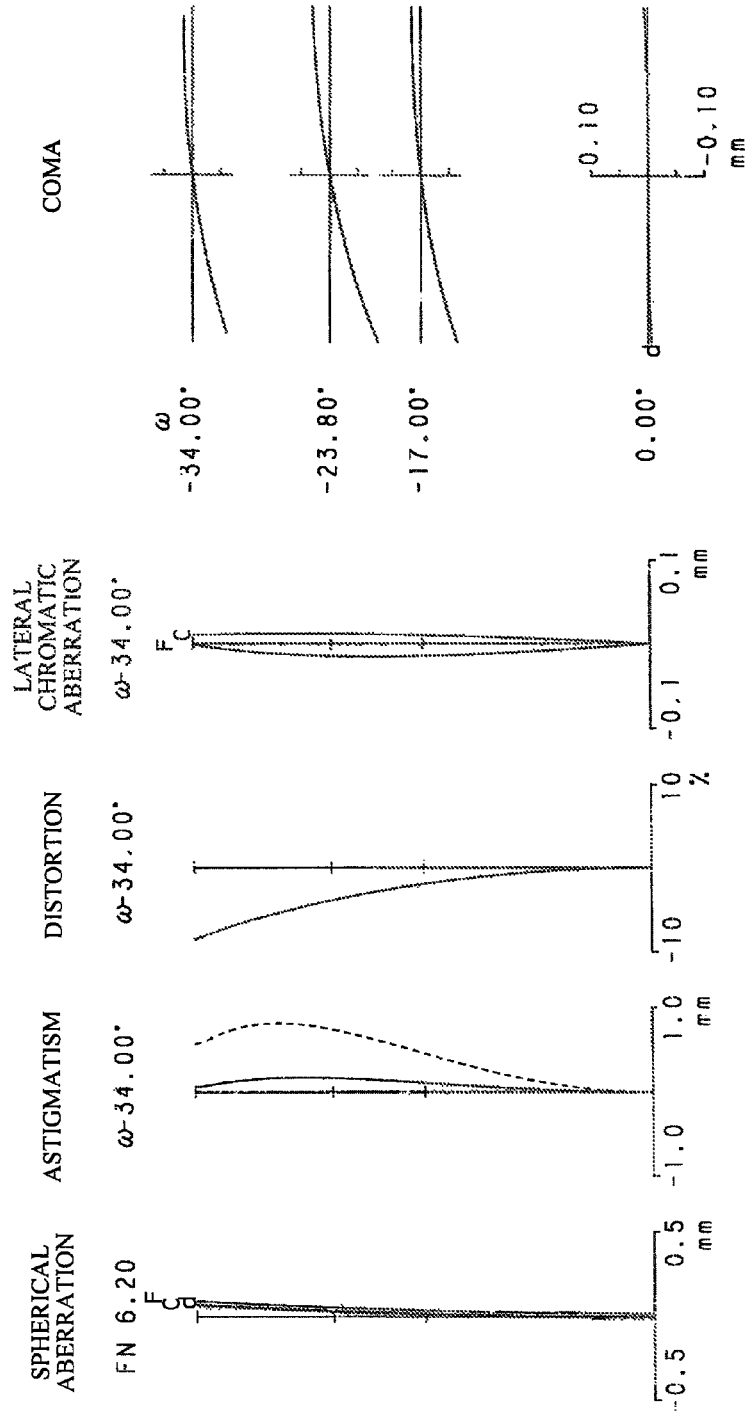
FIG. 8(b) shows an intermediate focal length state.
Figure 8C:
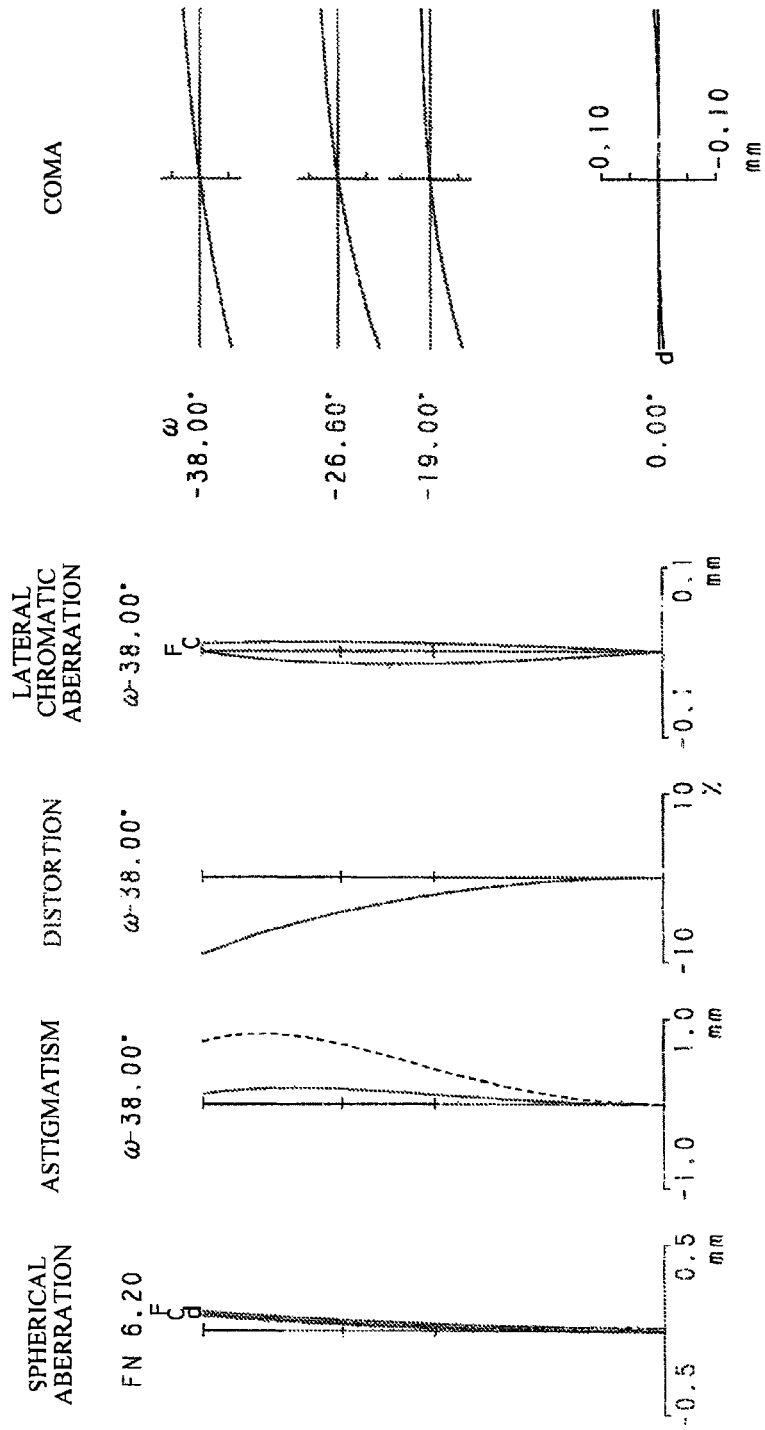
FIG. 8(c) shows a high power end state.

FIG. 8 shows diagrams of aberrations including the spherical aberration, astigmatism, distortion, lateral chromatic aberration and coma of the ocular zoom optical system 3 according to the third example in the low power end state, the intermediate focal length state and the high power end state. As is apparent from each aberration diagram shown in FIG. 8, the ocular zoom optical system 3 according to this third example has a wide apparent field of view of at least 60° on the low power side. The aberrations are favorably corrected while a sufficient eye relief is secured over the entire zoom range.

Fourth Example

Figure 9:
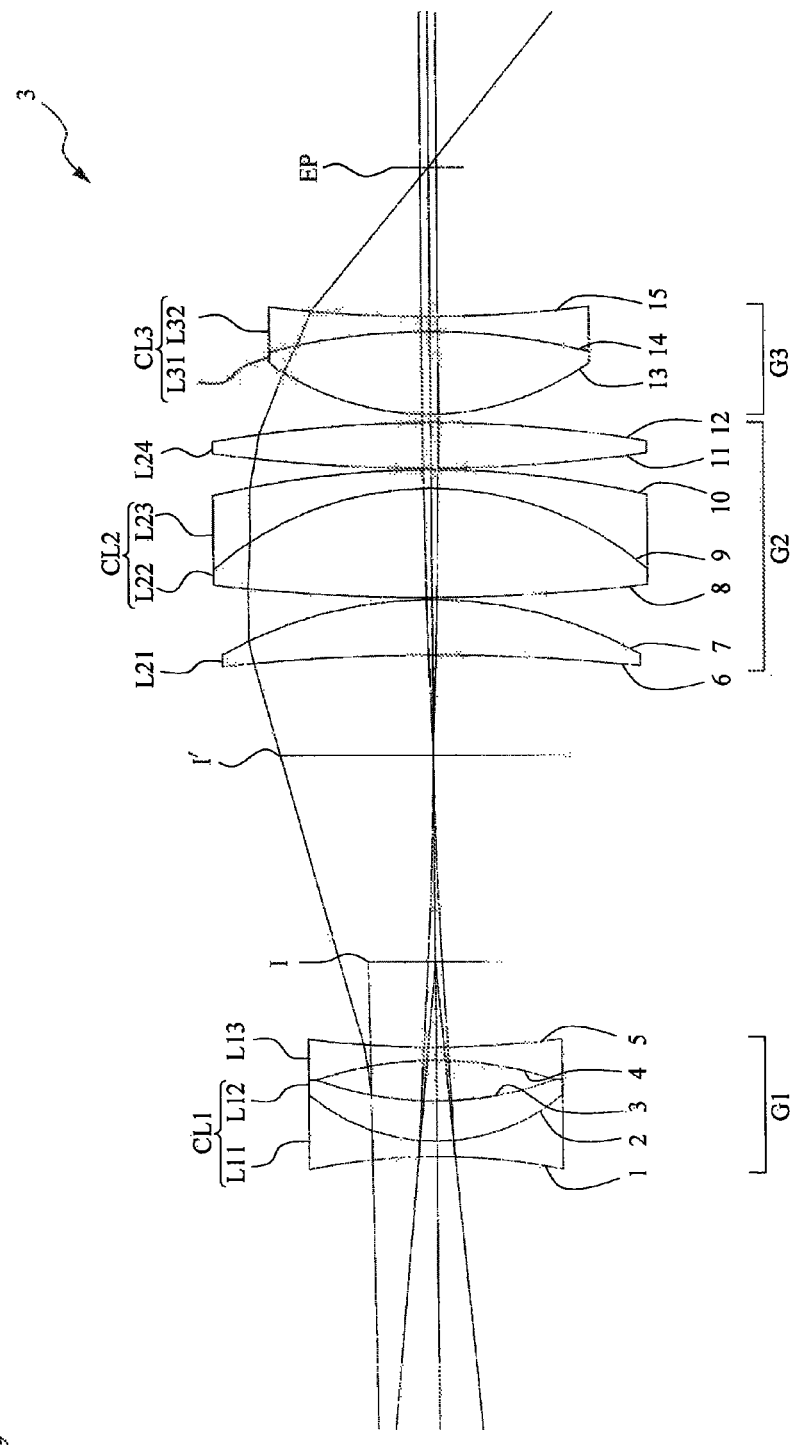
FIG. 9 is a lens configuration diagram showing an ocular zoom optical system according to a fourth example.

FIG. 9 shows an ocular zoom optical system 3 according to a fourth example. The ocular zoom optical system 3 according to the fourth example includes, in order from the object side: a first lens group G1 having a negative refractive power; a second lens group G2 having a positive refractive power; and a third lens group G3 having a positive refractive power. An intermediate image I' of an object to be observed is formed between the first lens group G1 and the second lens group G2. The first lens group G1 includes, in order from the object side: a cemented lens CL1 including a biconcave lens L11 and a positive meniscus lens L12 with its convex surface on the object side; and a biconcave lens L13. The second lens group G2 includes, in order from the object side: a positive meniscus lens (positive single lens) L21 with its concave surface on the object side; a cemented lens (positive cemented lens) CL2 including a biconvex lens (positive lens) L22 and a negative meniscus lens (negative lens) L23 with its convex surface on the eye-point EP side; and a biconvex lens L24. The third lens group G3 is a cemented lens CL3 including a biconvex lens (positive lens) L31 and a biconcave lens L32 in order from the object side.

In the ocular zoom optical system 3 according to the fourth example, the positive meniscus lens (positive single lens) L21 included in the second lens group G2 has a higher positive refractive power on the lens surface (seventh surface) on the eye-point side than that on the lens surface (sixth surface) on the object side. The biconvex lens (positive lens) L31 included in the third lens group G3 has a higher refractive power on the lens surface (thirteenth surface) on the object side than that on the lens surface (fourteenth surface) on the eye-point side. This lens surface on the object side has an aspheric surface shape.

The following Table 10 shows specifications of the ocular zoom optical system 3 according to the fourth example show in FIG. 9.

TABLE 10

Entire specifications f = 17.5 to 8.74
2ω = 64.0° to 80.0°
ER = 18.5 to 15.0

Lens data

| m | r | d | nd | vd |
|---|---|---|---|---|
| 1 | −60.0 | 1.5 | 1.51680 | 64.1 |
| 2 | 18.5 | 4.0 | 1.75520 | 27.5 |
| 3 | 32.884 | 4.0 | | |
| 4 | −35.308 | 1.3 | 1.51680 | 64.1 |
| 5 | 93.795 | d1 | | |
| 6 | −180.0 | 5.5 | 1.69680 | 55.5 |
| 7 | −40.0 | 0.2 | | |
| 8 | 180.0 | 10.8 | 1.72916 | 54.7 |
| 9 | −31.5 | 1.8 | 1.80518 | 25.4 |
| 10 | −90.0 | 0.2 | | |
| 11 | 150.0 | 4.5 | 1.72916 | 54.7 |
| 12 | −119.051 | d2 | | |
| 13* | 25.0 | 8.2 | 1.69350 | 53.2 |
| 14 | −60.0 | 1.5 | 1.80518 | 25.4 |
| 15 | 123.327 | ER | | |

Aspheric surface data

| thirteenth surface | κ = −0.58 | $C_4 = 0$ | $C_6 = 0$ |
|---|---|---|---|

As described above, in the ocular zoom optical system 3 according to this fourth example, during zooming, the third lens group G3 is fixed on the optical axis, and the first lens group G1 and the second leas group G2 are moved on the optical axis. Accordingly, an air space d1 between the first lens group G1 and the second lens group G2 on the optical axis, and an air space d2 between the second lens group G2 and the third lens group G3 on the optical axis, and the eye relief ER are changed. The following Table 11 shows the focal lengths and separations of the ocular zoom optical system 3 according to this second example.

TABLE 11

Focal length and separation

| f | Ff | d1 | d2 | ER |
|---|---|---|---|---|
| 17.5 | 13.52 | 15.58 | 18.39 | 18.5 |
| 12.4 | 16.81 | 26.56 | 10.69 | 15.2 |
| 8.74 | 19.29 | 38.90 | 0.83 | 15.0 |

The following Table 12 shows values corresponding to the conditional expressions (1) to (10) of the ocular zoom optical system 3 according to this fourth example.

TABLE 12 f1 = −24.8
f2 = 30.5
f3 = 48.5
f21 = 72.6

Condition corresponding values

| (1) | f21/f2 = 2.4 |
| (2) | vd21 = 55.5 |
| (3) | f2/(fC2 − fF2) = 120.7 |

TABLE 12-continued

| (4) | (rb + ra)/(rb − ra) = −1.6 |
| (5) | nd31 = 1.69 |
| (6) | vd31 = 53.2 |

| (7) | h | $d^2x/dh^2$ | lower limit (left side) | upper limit (right side) |
|---|---|---|---|---|
| | 0.0 | 0.04000 | 0.04000 | 0.04000 |
| | 1.0 | 0.04004 | 0.03998 | 0.04006 |
| | 2.0 | 0.04016 | 0.03992 | 0.04023 |
| | 3.0 | 0.04037 | 0.03983 | 0.04052 |
| | 4.0 | 0.04065 | 0.03969 | 0.04094 |
| | 5.0 | 0.04103 | 0.03952 | 0.04148 |
| | 6.0 | 0.04150 | 0.03932 | 0.04217 |
| | 7.0 | 0.04206 | 0.03908 | 0.04300 |
| | 8.0 | 0.04273 | 0.03880 | 0.04399 |
| | 9.0 | 0.04350 | 0.03849 | 0.04516 |
| | 10.0 | 0.04440 | 0.03815 | 0.04654 |
| | 11.0 | 0.04543 | 0.03778 | 0.04814 |
| | 12.0 | 0.04660 | 0.03739 | 0.05000 |
| | 13.0 | 0.04793 | 0.03696 | 0.05217 |
| | 14.0 | 0.04944 | 0.03651 | 0.05468 |
| | 15.0 | 0.05115 | 0.03604 | 0.05762 |
| (8) | (−f1)/fm = 2.8 | | | |
| (9) | f2/fm = 3.5 | | | |
| (10) | f3/fm = 5.5 | | | |

Thus, in the fourth example, the conditional expressions (1) to (10) are satisfied.

Figure 10A:
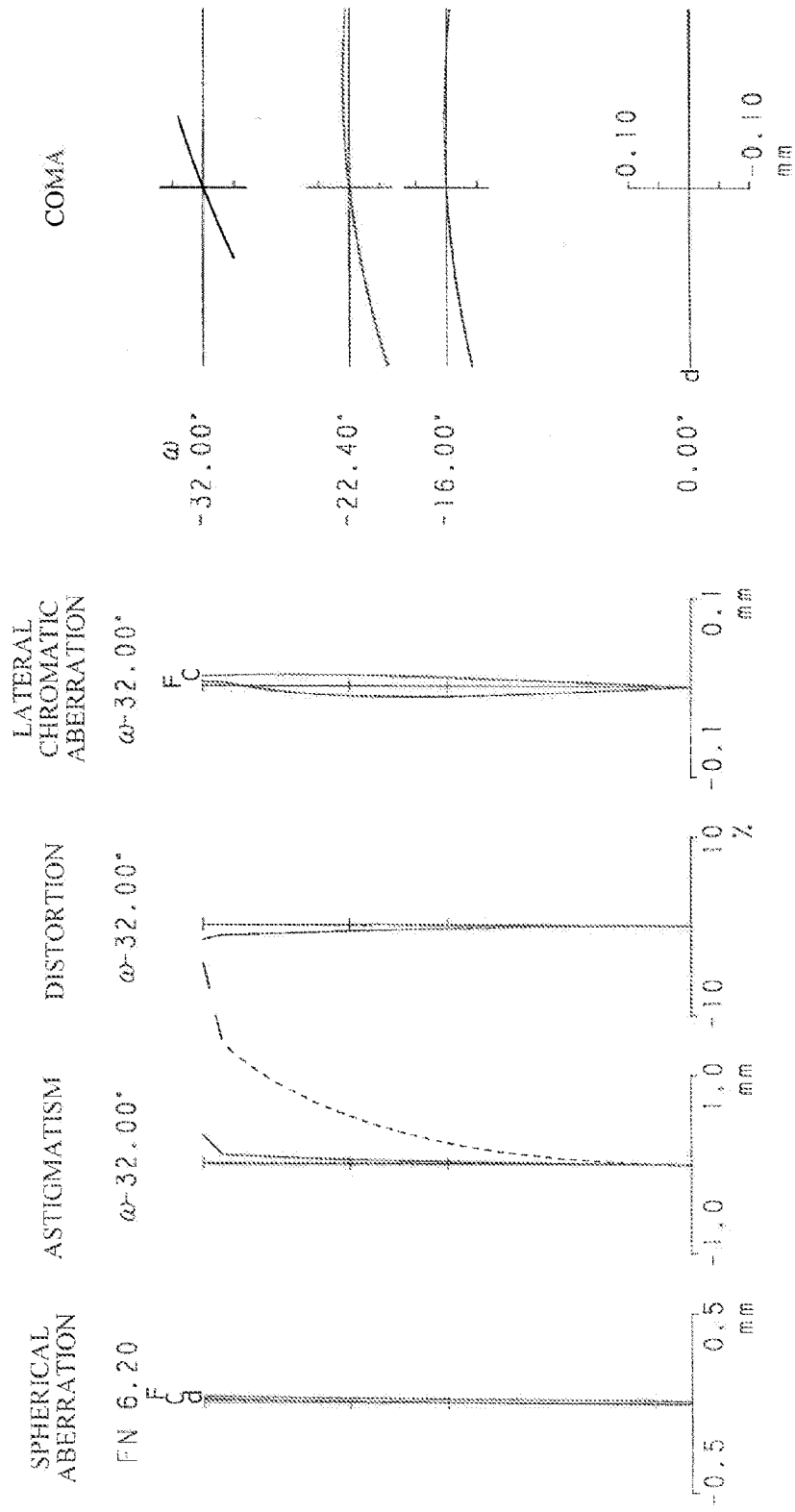
FIG. 10(a) shows a low power end state.
Figure 10B:
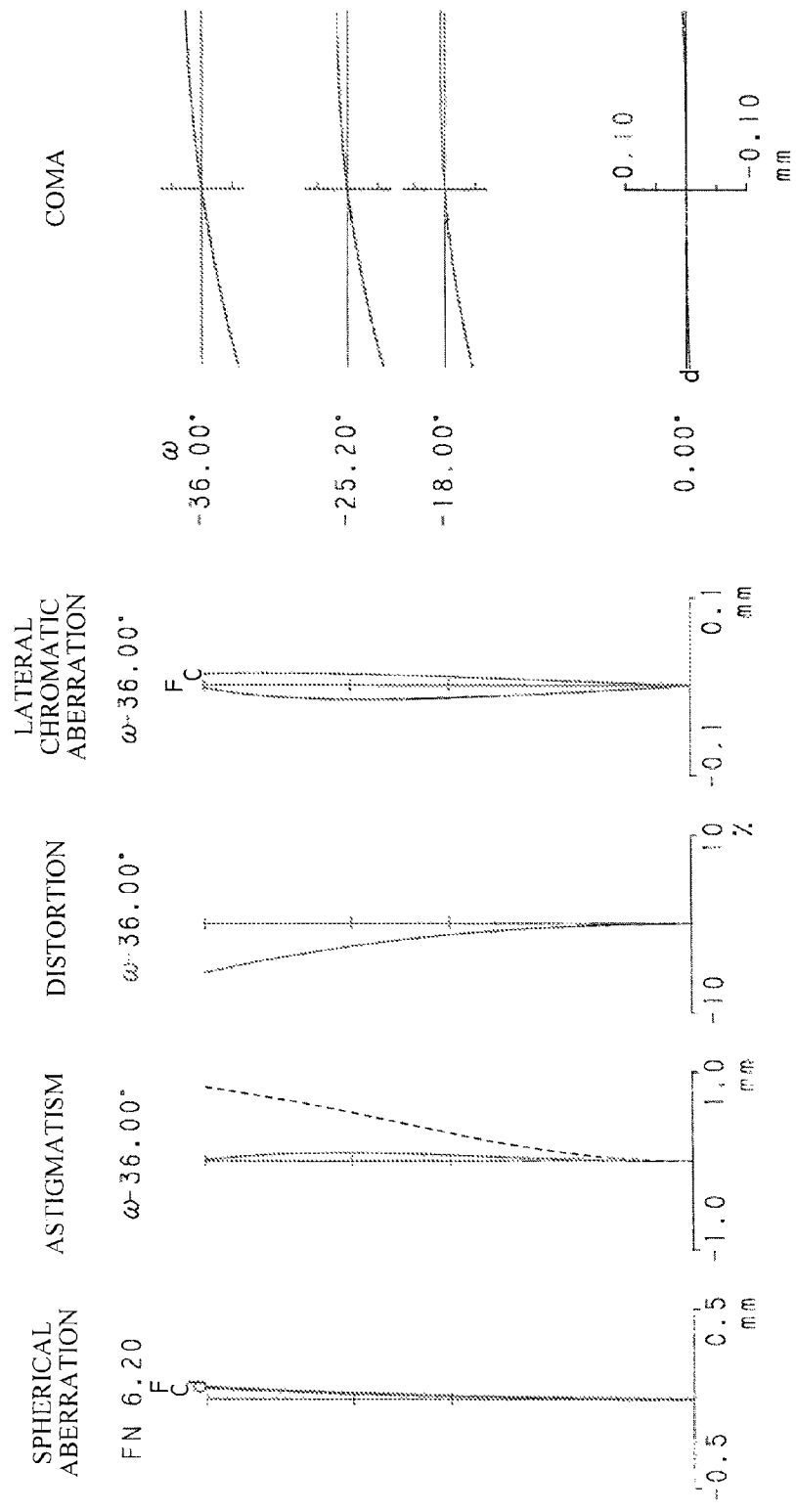
FIG. 10(b) shows an intermediate focal length state.

FIG. 10 shows diagrams of aberrations including the spherical aberration, astigmatism, distortion, lateral chromatic aberration and coma of the ocular zoom optical system 3 according to the fourth example in the low power end state, the intermediate focal length state and the high power end state. As is apparent from each aberration diagram shown in FIG. 10, the ocular zoom optical system 3 according to this fourth example has a wide apparent field of view of at least 60° on the low power side. The aberrations are favorably corrected while a sufficient eye relief is secured over the entire zoom range.

REFERENCE SIGNS LIST

3 ocular zoom optical system TL telescope optical system (optical instrument)
G1 first lens group G2 second lens group G3 third lens group
    The invention claimed is:
    1. An ocular zoom optical system, comprising, in order from an object side: a first lens group having a negative refractive power; a second lens group having a positive refractive power; and a third lens group having a positive refractive power and at least one aspheric surface,
    wherein an intermediate image is formed between the first lens group and the second lens group,
    during zooming, the third lens group is fixed on an optical axis, and the first lens group and the second lens group are moved in directions opposite to each other with the intermediate image interposed therebetween,
    the second lens group comprises, in order from the object side: a positive single lens whose lens surface on an eye-point side has a higher positive refractive power than a lens surface on the object side has; and a positive cemented lens comprising a positive lens and a negative lens, and
    conditions of following expressions are satisfied, $2.1 < f21/f2 < 2.8$, $vd21 > 55$, $f2/(fC2 - fF2) > 90$, where a focal length of the second lens group is f2, a focal length of the single lens is f21, an Abbe number of a medium of the single lens is vd21, a focal length of the second lens group for C-line is fC2, and a focal length for F-line is fF2.

2. The ocular zoom optical system according to claim 1, wherein the single lens included in the second lens group is a lens whose convex surface is on the eye-point side, and a condition of a following expression is satisfied, $-2.2 \leq (rb+ra)/(rb-ra) \leq -1.0$, where a radius of curvature of a lens surface on the object side of the single lens is ra, and a radius of curvature of a lens surface on the eye-point side is rb.

3. The ocular zoom optical system according to claim 1, wherein the third lens group is a cemented lens comprising a positive lens whose lens surface on the object side has a higher refractive power than a lens surface on the eye-point side has, and a biconcave lens, in order from the object side, and conditions of following expressions are satisfied, $$1.65 < nd31 < 1.74,$$

$$vd31 > 50,$$

where a refractive index of a medium of the positive lens included in the third lens group for d-line is nd31, and an Abbe number is vd31.

4. The ocular zoom optical system according to claim 1, wherein a lens surface on the object side of the positive lens included in the third lens group is an aspheric surface satisfying a condition of a following expression in a range of $0 \leq h \leq 15$, $$\frac{c}{(1+0.2c^2h^2)^{1.5}} \leq \frac{d^2x}{dh^2} \leq \frac{c}{(1-0.6c^2h^2)^{1.5}} \quad \text{[Expression 4]}$$

where a height from the optical axis is h, a sag amount at the height h is x, and a reciprocal of a paraxial radius of curvature is c.

5. The ocular zoom optical system according to claim 1, wherein conditions of following expressions are satisfied, $$2.5 < (-f1)/fm < 3.0,$$

$$3.2 < f2/fm < 4.0,$$

$$5.0 < f3/fm < 6.2,$$

where a focal length of the entire system in a high power end state is fm, a focal length of the first lens group is f1, and a focal length of the third lens group is f3.

6. An optical instrument comprising the ocular zoom optical system according to claim 1.

* * * * *